(12) United States Patent
Okabe et al.

(10) Patent No.: US 11,974,061 B2
(45) Date of Patent: Apr. 30, 2024

(54) DISPLAY PROCESSING DEVICE, DISPLAY PROCESSING METHOD, AND RECORDING MEDIUM

(71) Applicant: Panasonic Intellectual Property Management Co., Ltd., Osaka (JP)

(72) Inventors: Yoshimasa Okabe, Kanagawa (JP); Takanori Setsu, Kanagawa (JP); Toshihiko Hashinaga, Tokyo (JP)

(73) Assignees: PANASONIC AUTOMOTIVE SYSTEMS CO., LTD., Kanagawa (JP); PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 0 days.

(21) Appl. No.: 18/203,887

(22) Filed: May 31, 2023

(65) Prior Publication Data

US 2024/0022679 A1 Jan. 18, 2024

(30) Foreign Application Priority Data

Jul. 13, 2022 (JP) .................................. 2022-112234

(51) Int. Cl.
| | |
|---|---|
| *G09G 5/00* | (2006.01) |
| *B60R 1/22* | (2022.01) |
| *G06F 3/04845* | (2022.01) |
| *G06F 3/0488* | (2022.01) |

(Continued)

(52) U.S. Cl.
CPC ............ *H04N 5/2624* (2013.01); *B60R 1/22* (2022.01); *G06F 3/04845* (2013.01); *G06F 3/0488* (2013.01); *H04N 7/183* (2013.01); *B60R 2300/30* (2013.01); *B60R 2300/607* (2013.01)

(58) Field of Classification Search
CPC . G06F 3/04845; G06F 3/0488; H04N 5/2624; H04N 7/183; B60R 1/22; B60R 2300/30; B60R 2300/607
See application file for complete search history.

(56) References Cited

U.S. PATENT DOCUMENTS

| | | | | |
|---|---|---|---|---|
| 10,363,872 | B2 * | 7/2019 | Kubota | .................... B60R 1/00 |
| 10,873,725 | B2 * | 12/2020 | Kohara | .................... H04N 7/18 |
| 10,922,977 | B2 * | 2/2021 | Watanabe | ............ H04N 13/111 |

(Continued)

FOREIGN PATENT DOCUMENTS

JP 2016-053942 4/2016

*Primary Examiner* — Joe H Cheng
(74) *Attorney, Agent, or Firm* — Greenblum & Bernstein, P.L.C.

(57) ABSTRACT

A display processing device is installed in a vehicle. The display processing device includes a hardware processor coupled to a memory. The processor acquires an image obtained by capturing a periphery of the vehicle and generates a bird's-eye view image of the periphery of the vehicle. The processor estimates a movement amount of the vehicle and generates past images whose capturing times are past time points. The past images are generated on the basis of the movement amount of the vehicle and a past bird's-eye view image. The processor generates a display image to be displayed on a display device in the vehicle by combining the past images and the bird's-eye view image. When occurrence of a skid phenomenon of the wheel is detected, the processor generates the display image by performing, on the past images, processing indicating that the skid phenomenon has occurred.

15 Claims, 17 Drawing Sheets

(51) Int. Cl.
*H04N 5/262* (2006.01)
*H04N 7/18* (2006.01)

(56) References Cited

U.S. PATENT DOCUMENTS

| | | | |
|---|---|---|---|
| 2016/0291143 A1* | 10/2016 | Cao | G01S 13/874 |
| 2017/0148136 A1* | 5/2017 | Lee | B60W 30/06 |
| 2019/0149774 A1* | 5/2019 | Watanabe | H04N 7/181 |
| | | | 348/148 |
| 2021/0023994 A1* | 1/2021 | Watanabe | G06T 19/20 |

\* cited by examiner (Aa)

(Ab)

(Ba)

(Bb)

DISPLAY PROCESSING DEVICE, DISPLAY PROCESSING METHOD, AND RECORDING MEDIUM

CROSS-REFERENCE TO RELATED APPLICATIONS

This application is based upon and claims the benefit of priority from Japanese Patent Application No. 2022-112234, filed on Jul. 13, 2022, the entire contents of which are incorporated herein by reference.

FIELD

The present disclosure relates to a display processing device, a display processing method, and a display processing program.

BACKGROUND

There is a display processing device having a function of transparently displaying an underfloor space of a traveling vehicle. For example, in the technique of JP 2016-53942 A, a plurality of past images and a real-time image are combined to perform an underfloor transmission display. At this time, image matching processing is performed to correct a shift occurring at a joint between the past image and the real-time image due to an error in calculating the movement amount of the vehicle.

However, in the technique of JP 2016-53942 A, since a shift amount is calculated by comparing a plurality of images with each other, an enormous amount of calculation is required, and the cost of the display processing device becomes high. In addition, in a case where a target object does not exist in the joint portion, it is difficult to perform the image matching processing.

SUMMARY

A display processing device according to one embodiment of the present disclosure is installed in a vehicle. The display processing device includes a hardware processor coupled to a memory. The hardware processor is configured to acquire an image obtained by capturing a periphery of the vehicle and generate a bird's-eye view image of the periphery of the vehicle on the basis of the image. The hardware processor is configured to estimate a movement amount of the vehicle on the basis of a rotation amount of a wheel detected by the vehicle. The hardware processor is configured to generate one or more past images whose capturing times are past time points. The one or more past images are generated on the basis of the movement amount of the vehicle and a past bird's-eye view image being the bird's-eye image stored at a past time point. The hardware processor is configured to generate a display image to be displayed on a display device in the vehicle. The display image is generated by combining the one or more past images and the bird's-eye view image. When occurrence of a skid phenomenon of the wheel is detected, the hardware processor generates the display image by performing, on the one or more past images, processing indicating that the skid phenomenon has occurred.

DETAILED DESCRIPTION

Hereinafter, embodiments of a display processing device, a display processing method, and a recording medium according to the present disclosure will be described with reference to the drawings.

Embodiments

Embodiments will be described with reference to the drawings.

Configuration Example of Vehicle

Figure 1:
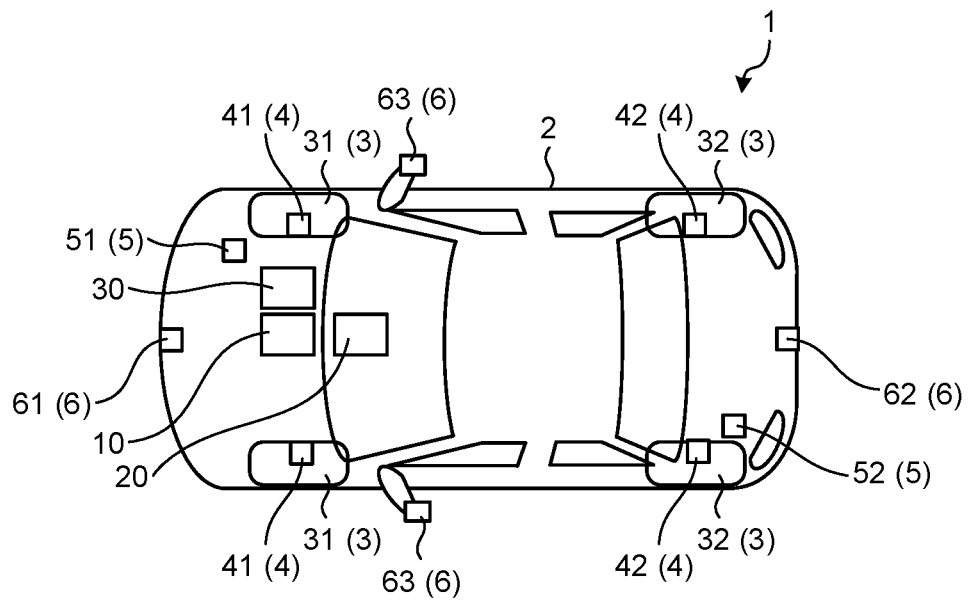
FIG. 1 is a schematic diagram illustrating an example of a configuration of a vehicle in which a display ECU according to an embodiment is installed.

FIG. 1 is a schematic diagram illustrating an example of a configuration of a vehicle 1 in which a display electronic control unit (ECU) 10 according to an embodiment is installed. In the present specification, the forward, rearward, left, right, upward, and downward directions of the vehicle 1 are directions based on a driver's seat of the vehicle 1.

As illustrated in FIG. 1, the vehicle 1 includes a vehicle body 2 and two pairs of wheels 3 coupled to the vehicle body 2 in a predetermined direction. Among these wheels 3, a pair of front wheels 31 is attached to the lower surface on the front side of the vehicle body 2, and a pair of rear wheels 32 is attached to the lower surface on the rear side of the vehicle body 2.

The vehicle body 2 has a substantially rectangular shape in top view and includes the wheels 3 (the front wheel 31 and the rear wheel 32).

A wheel speed sensor 4 (a wheel speed sensor 41 is provided in the front wheel 31, and a wheel speed sensor 42 is provided in the rear wheel 32) is attached to each of the wheels 3 (the front wheel 31 and the rear wheel 32). The wheel speed sensor 4 outputs a wheel speed pulse each time the corresponding wheel 3 rotates by a predetermined angle. By counting the number of outputs of the wheel speed pulse per predetermined time, the rotation speed of the corresponding wheel 3 can be calculated. The wheel speed is obtained by multiplying the number of rotations of the wheel 3 per predetermined time calculated from the wheel speed pulse by the outer peripheral length of the wheel 3.

An acceleration sensor 5 (51, 52) is attached to each of front and rear portions of the vehicle body 2. The acceleration sensor 5 is configured as, for example, a three-axis acceleration sensor configured to detect acceleration received by the vehicle body 2 by disassembling the acceleration in three axial directions including the forward-and-rearward direction, the upward-and-downward direction, and the leftward-and-rightward direction, and to output each detection result.

The acceleration sensor 51 may be provided at, for example, a position slightly right on the front side of the vehicle body 2, and the acceleration sensor 52 may be provided at, for example, a position slightly left on the rear side of the vehicle body 2. With this arrangement, these acceleration sensors 5 are offset from any of the three axes of rotation (pitch axis, roll axis, and yaw axis) passing through the center of gravity of the vehicle body 2. For this reason, when the vehicle body 2 is rotated by external force, the external force can be effectively detected by the acceleration sensor 5 regardless of whether the rotation is centered on any of the pitch axis, the roll axis, or the yaw axis.

Moreover, the acceleration sensor 5 detects gravitational acceleration even when the vehicle 1 is stationary. Therefore, the posture of the vehicle 1 can be specified by the acceleration sensor 5.

The vehicle 1 only needs to include at least one acceleration sensor 5. However, as in the example of FIG. 1, by providing the acceleration sensors 5 respectively at the front and rear portions of the vehicle body 2, an irregular posture change of the vehicle body 2, in which only the rear portion of the vehicle body 2 sideslips (or skids in a lateral direction), can be detected more accurately. Therefore, it is preferable that a necessary number of the acceleration sensors 5 are disposed at positions advantageous for detecting the acceleration of the vehicle 1.

Imaging devices 6 (61, 62, 63, 63) are installed in the front, rear, left, and right of the vehicle body 2, respectively. The imaging device 6 is, for example, a digital camera incorporating an imaging element such as a charge coupled device (CCD) or a CMOS image sensor (CIS).

The imaging devices 61 and 62 are installed in the front and rear of the vehicle body 2 at positions higher than a position of a bumper. The imaging devices 63 and 63 are built in left and right side mirrors of the vehicle body 2. With such an arrangement, the periphery of the vehicle 1 can be captured by these imaging devices 6.

The display ECU 10 and a sensor control device 30 are installed in the vehicle 1, and a human machine interface (HMI) device 20 is provided in the vehicle 1.

The HMI device 20 as a display device includes a touch panel, a speaker, a switch, and the like, and is disposed, for example, near the driver's seat. The touch panel, the speaker, the switch, and the like included in the HMI device 20 may be shared with a navigation system, and the navigation system may have a function as a display device.

The display ECU 10 as a display processing device is configured as an electronic control device that controls various displays in the HMI device 20. The display ECU 10 acquires an image of the periphery of the vehicle 1 captured by the imaging device 6, performs various types of processing, generates a display image such as a bird's-eye view image in which a plurality of images are combined, and outputs the display image to the HMI device 20. Note that, as a conventional or simple expression, there is a case where generating a display image and outputting the display image to a display device is simply referred to as displaying, and controlling the generation of the display image is simply referred to as controlling the display.

In addition, the display ECU 10 acquires detection results by various sensors such as the wheel speed sensor 4 and the acceleration sensor 5 via the sensor control device 30 or directly. The display ECU 10 performs various types of arithmetic processing necessary for generating a display image by using the acquired detection results.

The sensor control device 30 acquires the detection results by various sensors such as the wheel speed sensor 4 and the acceleration sensor 5, performs various types of processing, and outputs the results to a control device of each unit of the vehicle 1 such as the display ECU 10.

Figure 2:
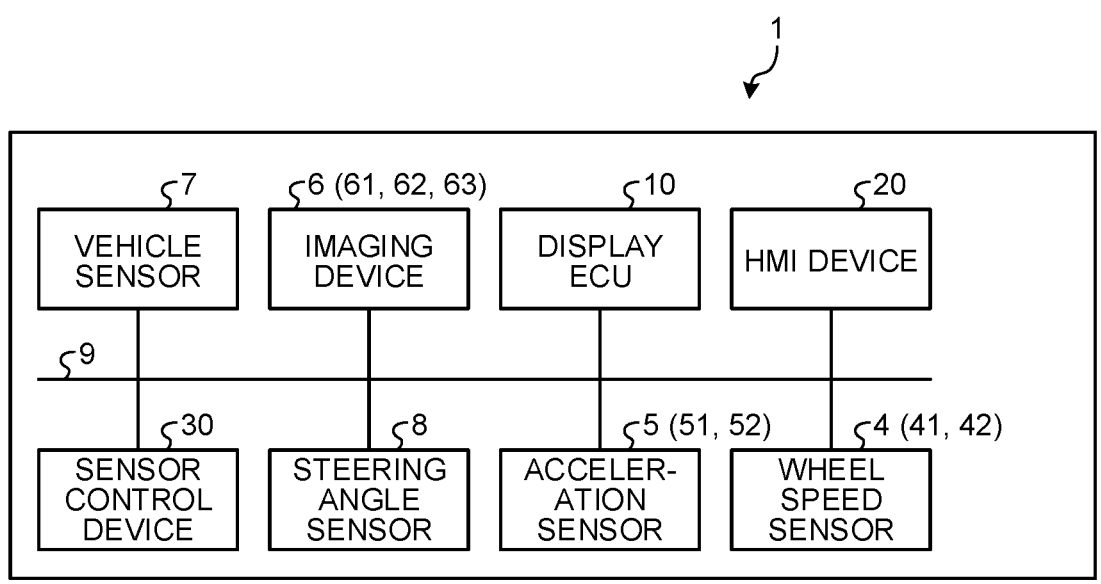
FIG. 2 is a block diagram illustrating the example of the configuration of the vehicle in which the display ECU according to the embodiment is installed.

FIG. 2 is a block diagram illustrating an example of a configuration of the vehicle 1 in which the display ECU 10 according to the embodiment is installed. In FIG. 2, a configuration mainly related to the display ECU 10 is illustrated, whereas configurations of the vehicle body 2, the engine, and the like are omitted. In addition, the number of blocks illustrated in FIG. 2 does not necessarily coincide with the number of physical configurations included in the vehicle 1.

As illustrated in FIG. 2, the vehicle 1 includes the wheel speed sensor 4 (41, 42), the acceleration sensor 5 (51, 52), the imaging device 6 (61, 62, 63, 63), a vehicle sensor 7, a steering angle sensor 8, the display ECU 10, the HMI device 20, and the sensor control device 30. These components are connected in a wired manner by, for example, an in-vehicle local area network (LAN) 9.

Note that the transmission amount of image data generated by the imaging device 6 is large. Therefore, the imaging device 6 and the display ECU 10, which are transmission routes of the image data, and the display ECU 10 and the HMI device 20 may be connected by a dedicated coaxial cable or the like.

The steering angle sensor 8 detects a steering angle of a steering wheel of the vehicle 1.

The vehicle sensor 7 is an activation switch of the vehicle 1, a switch of a gear position, a switch of a winker lever, a torque sensor of a motor and an engine, and the like. However, the wheel speed sensor 4, the acceleration sensor 5, the steering angle sensor 8, and the like described above may also be referred to as vehicle sensors.

As described above, the sensor control device 30 processes output data from various sensors such as the wheel speed sensor 4, the acceleration sensor 5, the steering angle sensor 8, and the vehicle sensor 7. However, as described above, the display ECU 10 may acquire the output data from various sensors without passing through the sensor control device 30, or may process the output data acquired from these sensors. The sensor control device 30 may be incorporated into the display ECU 10 or may be installed as a sensor control unit of the display ECU 10.

The HMI device 20 displays a display image or the like generated by the display ECU 10 on the touch panel, and outputs a voice from the speaker. The HMI device 20 receives various operations including an instruction from the occupant of the vehicle 1 to the display ECU 10 by a touch panel, a switch, or the like. Here, the occupants include a driver and a passenger of the vehicle 1.

Moreover, the HMI device 20 may be configured to be able to receive various operations by voice by further including a microphone and a voice recognition function. An operation device including a switch or the like may be provided independently of the HMI device 20.

Configuration Example of Display ECU

Figure 3:
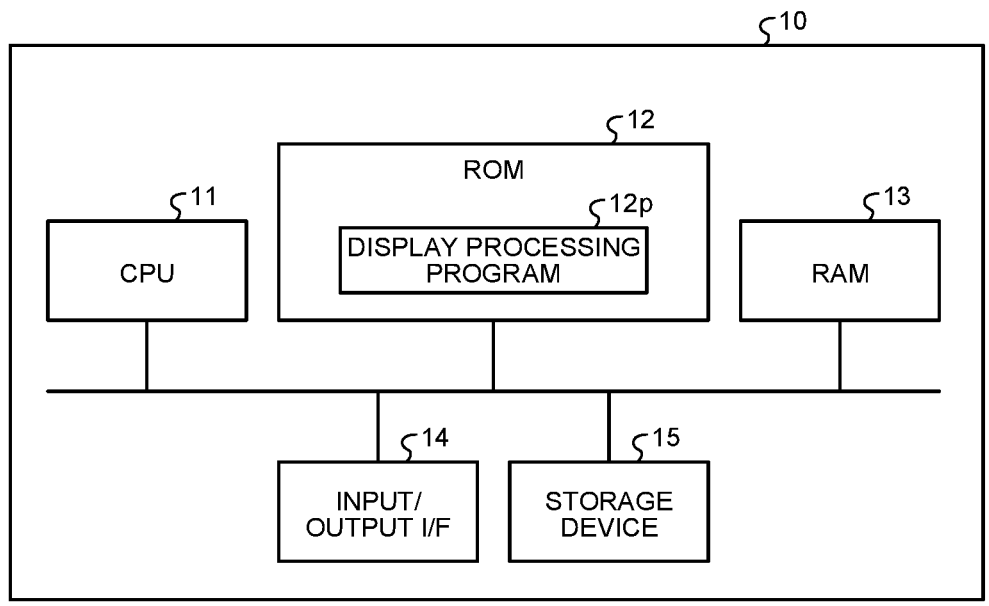
FIG. 3 is a block diagram illustrating an example of a hardware configuration of the display ECU according to the embodiment.

Next, a configuration example of the display ECU 10 according to the embodiment will be described with reference to FIGS. 3 and 4. FIG. 3 is a block diagram illustrating an example of a hardware configuration of the display ECU 10 according to the embodiment.

As illustrated in FIG. 3, the display ECU 10 is configured as a computer including a central processing unit (CPU) 11, a read only memory (ROM) 12, a random access memory (RAM) 13, an input/output interface (I/F) 14, and a storage device 15.

However, the display ECU 10 may include another processor such as an application specific integrated circuit (ASIC) or a field programmable gate array (FPGA) instead of the CPU 11.

The CPU 11 (an example of the hardware processor) controls the entire display ECU 10. The ROM 12 includes an electrically rewritable storage element, stores a program executed by the CPU 11, and also functions as a storage area in the display ECU 10. Information stored in the ROM 12 is stored even when the display ECU 10 is powered off. The RAM 13 (an example of the memory) functions as a primary storage device and serves as a work area of the CPU 11.

The CPU 11 executes a display processing program 12p stored in the ROM 12, for example, so that a function as a display processing device that performs various displays on the HMI device 20 is implemented in the display ECU 10. That is, the display processing program 12p causes the display ECU 10 configured as, for example, a computer to perform various types of analysis processing to be described in detail below.

Note that, for example, the display processing program 12p can be provided by being stored in a recording medium or the like so as to be readable by a computer. The recording medium is, for example, a magnetic disk, an optical disk, a magneto-optical disk, a flash memory, or the like. Alternatively, the display processing program 12p may be downloadable from a server or the like placed on a network such as the Internet. In addition, the display processing program 12p may be configured to be provided or distributed via a network.

The HMI device 20 is connected to the input/output IF 14. As a result, a display image generated by the display ECU 10, a screen for receiving various operations by the occupant, a display screen of processing results according to the various operations, and the like can be displayed on the HMI device 20. Moreover, the display ECU 10 can also generate a voice message, and transmit the voice message to the occupant through the input/output IF 14 and the HMI device 20.

Moreover, the input/output I/F 14 is connected to the imaging device 6, and acquires image data generated by the imaging device 6 from the imaging device 6. Moreover, the input/output I/F 14 is connected to various sensors such as the wheel speed sensor 4, the acceleration sensor 5, and the steering angle sensor 8 via the sensor control device 30 or directly, and acquires output values from these sensors.

The storage device 15 is a hard disk drive (HDD), a solid state drive (SSD), an SD memory card, or the like, and functions as an auxiliary storage device of the CPU 11.

Figure 4:
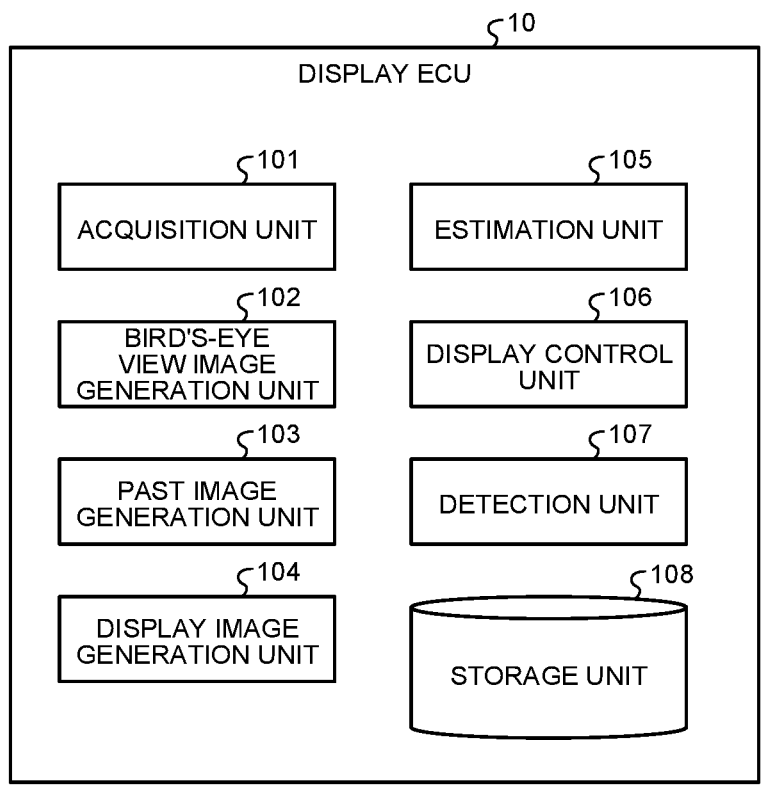
FIG. 4 is a block diagram illustrating an example of a functional configuration of the display ECU according to the embodiment.

FIG. 4 is a block diagram illustrating an example of a functional configuration of the display ECU 10 according to the embodiment. As illustrated in FIG. 4, the display ECU 10 includes an acquisition unit 101, a bird's-eye view image generation unit 102, a past image generation unit 103, a display image generation unit 104, an estimation unit 105, a display control unit 106, a detection unit 107, and a storage unit 108.

The acquisition unit 101 as an image acquisition unit acquires an image obtained by capturing the periphery of the vehicle 1, that is, a captured image, from the imaging device 6. In addition, the acquisition unit 101 acquires detection results by various sensors such as the wheel speed sensor 4, the acceleration sensor 5, and the steering angle sensor 8.

The above-described function of the acquisition unit 101 is implemented by, for example, the input/output I/F 14 that operates under the control of the CPU 11 that executes the display processing program 12p.

The bird's-eye view image generation unit 102 combines the captured images of the periphery of the vehicle 1 acquired from the imaging device 6 to generate a bird's-eye view image of the periphery of the vehicle 1. The bird's-eye view image is a composite image of viewpoints looking down the periphery of the vehicle 1 from above the vehicle 1.

The bird's-eye view image generation unit 102 combines the captured images of at least one imaging device 6, thereby making it possible to combine the bird's-eye view images including the movement direction of the vehicle 1 such as the front of the vehicle 1 moving forwards or the rear of the vehicle 1 moving rearwards. The bird's-eye view image generation unit 102 may generate the entire peripheral image of the vehicle 1 by combining the captured images of the plurality of imaging devices 6.

The image used for combining the bird's-eye view images is the latest captured image captured by the imaging device 6 and acquired by the display ECU 10. By generating the bird's-eye view image using these latest captured images, it is possible to cause the HMI device 20 to display an image indicating the current periphery of the vehicle 1. The bird's-eye view image, which is generated by using the latest captured images, is referred to as a real-time image.

A blind spot region that is not displayed in the real-time image exists under the vehicle body 2. Since the road surface under the vehicle body 2 cannot be imaged by any imaging device 6, the same becomes a blind spot region that is not displayed in the real-time image. When displaying the entire peripheral images, there are many examples in which an icon imitating the vehicle body 2 is displayed at a position where the blind spot region is hidden, so that the presence of the blind spot region is not recognized. The display ECU 10 according to the embodiment generates a display image to be displayed on the HMI device 20 by combining a past image described below and a real-time image.

The past image is an image generated on the basis of a past bird's-eye view image obtained by storing a bird's-eye view image at a past time point and a past bird's-eye view image. Specifically, the real-time image is stored in the storage unit 108, and the same is read after a lapse of time, thereby obtaining, as the past image, a past bird's-eye view image whose capturing time is a past time point, or the past image is an image generated on the basis of a past bird's-eye view image obtained by cutting out or moving a part thereof. The capturing time of the past bird's-eye view image accurately refers to the capturing time of the captured image that is the basis of the past bird's-eye view image, and regarding the past image based on the past bird's-eye view image, the capturing time of the captured image that is the basis of the past image is also referred to as the capturing time of the past image.

With movement of the vehicle 1, the road surface projected in the traveling direction of the vehicle 1 is shifted in (or enters) a blind spot region below the vehicle body 2. Therefore, the past bird's-eye view image is moved according to the distance and direction in which the vehicle 1 has moved after the capturing time of the past bird's-eye view image, and part of the past bird's-eye view image that has entered the blind spot region is cut out as the past image. The blind spot can be compensated by fitting the past image into the real-time image.

As a result, the display ECU 10 has the underfloor transmission display function of displaying the blind spot region as if the blind spot region below the vehicle body 2 is seen through the underfloor space of the vehicle body 2. When a vehicle icon is displayed in the underfloor transmission display image, the vehicle icon may be displayed in a semi-transparent manner at a position overlapping the vehicle icon.

On the basis of the movement direction and the movement amount of the vehicle 1 calculated by the estimation unit 105, the past image generation unit 103 appropriately extracts a predetermined area from a plurality of bird's-eye view images having different capturing times which are generated so far and stored in the storage unit 108, and generates a plurality of past images having different capturing times.

More specifically, the past image generation unit 103 specifies an area that is hidden behind the vehicle body 2 and becomes a blind spot region at a predetermined time on the basis of the movement direction and the movement amount of the vehicle 1. In addition, the past image generation unit 103 extracts the latest image of an area to be a blind spot region at a predetermined time from the plurality of bird's-eye view images generated so far, and sets the extracted image as a past image corresponding to the blind spot region at the predetermined time.

By repeating the above processing at predetermined times, past images having different capturing times are generated. By generating a display image to be displayed on a display device in a vehicle by combining a plurality of past images having different capturing times and a bird's-eye view image, it is possible to create a display image in which the entire blind spot region under the floor is replaced with the past image and which looks as if there is no blind spot.

The display image generation unit 104 may combine the real-time image and the plurality of past images to generate a display image to be displayed on the HMI device 20, or may use the real-time image as the display image without using the past image. For example, when the estimation unit 105 detects a skid phenomenon, the display image generation unit 104 performs processing indicating that the skid phenomenon has occurred on the past image. The processing indicating that the skid phenomenon has occurred may be, for example, processing of hiding one or more past images or processing of adding an indication indicating that the skid phenomenon has occurred to the past image.

The estimation unit 105 estimates the movement direction and the movement amount of the vehicle 1 on the basis of detection results of the wheel speed sensor 4, the acceleration sensor 5, the steering angle sensor 8, and the like. In addition, when a phenomenon that the wheels 3 of the vehicle 1 skid occurs, the estimation unit 105 detects it as a skid phenomenon of the vehicle 1. The skid phenomenon refers to, for example, a phenomenon in which at least part of the wheels 3 loses its grip on the road surface and thereby the vehicle body 2 skids. The skid phenomenon can be simply referred to as a skid.

When such a skid phenomenon occurs, a mismatch, which cannot occur when all the wheels grip the road surface, occurs between the rotation amounts of the plurality of wheels 3 of the vehicle 1. The estimation unit 105 can estimate that the skid phenomenon has occurred in the vehicle 1 on the basis of such a mismatch.

In addition, when the wheel 3 grips the road surface, the increase/decrease in the rotation speed of the wheel 3 means acceleration/deceleration of the vehicle 1, and correlates with the acceleration in the horizontal direction detected by the acceleration sensor 5. However, when a skid phenomenon occurs in the vehicle 1, an abnormality of acceleration that does not coincide with the rotation speed of the wheel 3 appears. Therefore, it may be said that the estimation unit 105 detects the skid phenomenon on the basis of the rotation amount of the wheel 3 or the acceleration detected by the vehicle 1. Of course, the estimation unit 105 may detect the skid phenomenon by adding a detection result of the steering angle sensor 8 or the like. Details of the method of detecting the skid phenomenon by the estimation unit 105 will be described later.

In addition, when the skid phenomenon occurs, in the display image in which the real-time image and the plurality of past images are combined, there is a possibility that a joint between these images is shifted. The display image generation unit 104 generates a display image in which erroneous recognition or the like by an occupant is unlikely to occur by applying processing indicating that the skid phenomenon has occurred to the shifted past image.

In summary, a display processing device of the present embodiment is a display processing device installed in a vehicle, the display processing device including: an image acquisition unit that acquires an image obtained by capturing a periphery of the vehicle; a bird's-eye view image generation unit that generates a bird's-eye view image of the periphery of the vehicle on the basis of the image; an estimation unit that estimates a movement amount of the vehicle on the basis of a rotation amount of a wheel detected by the vehicle; a past image generation unit that generates one or more past images whose capturing times are past time points, on the basis of a past bird's-eye view image obtained by storing the bird's-eye view image at the past time point and the movement amount of the vehicle; and a display image generation unit that generates a display image to be displayed on a display device in the vehicle by combining the one or more past images and the bird's-eye view image. The display image generation unit generates, when the estimation unit detects that a skid phenomenon in which the wheel skids has occurred, the display image by performing processing indicating that the skid phenomenon has occurred on the one or more past images.

The above-described functions of the bird's-eye view image generation unit 102, the past image generation unit 103, the display image generation unit 104, and the estimation unit 105 are implemented by, for example, the CPU 11 that executes the display processing program 12p.

The display control unit 106 causes the HMI device 20 to display the display image generated by the display image generation unit 104, a screen for receiving various operations by an occupant, a display screen of processing results according to the various operations, etc. Moreover, the display control unit 106 also performs superimposition processing of superimposing a pattern, a mark, or a message indicating a past image in which a shift has occurred on the display image and outputting the superimposed image. Additionally, the display control unit 106 also performs a blending processing of overlapping a vehicle icon with a bird's-eye view image in a semi-transparent manner.

The detection unit 107 detects, for example, a touch operation of an occupant or the like on a touch panel included in the HMI device 20. More precisely, the HMI device 20 senses that the touch panel is touched and outputs information on the touched position. The detection unit 107 analyzes the information on the touched position, and detects what kind of touch operation has been performed. As a result, various operations of the occupant with respect to the display ECU 10 and the like are received. For example, when a button icon is displayed on the touch panel, in a case where a touched position corresponds to a range in which the button icon is displayed, the detection unit 107 detects that the displayed button is pressed.

The above-described functions of the display control unit 106 and the detection unit 107 are implemented by, for example, the CPU 11 that executes the display processing program 12p and the input/output IF 14 that operates under the control of the CPU 11.

The storage unit 108 stores the above-described display processing program 12p necessary for the operation of the display ECU 10, various control parameters, image data acquired by the display ECU 10, output values from various sensors, calculation results by the display ECU 10, and the like.

The above-described functions of the storage unit 108 are implemented by, for example, the ROM 12, the RAM 13, and the storage device 15 that operate under the control of the CPU 11 that executes the display processing program 12p.

Functional Example of Display ECU

Figure 5:
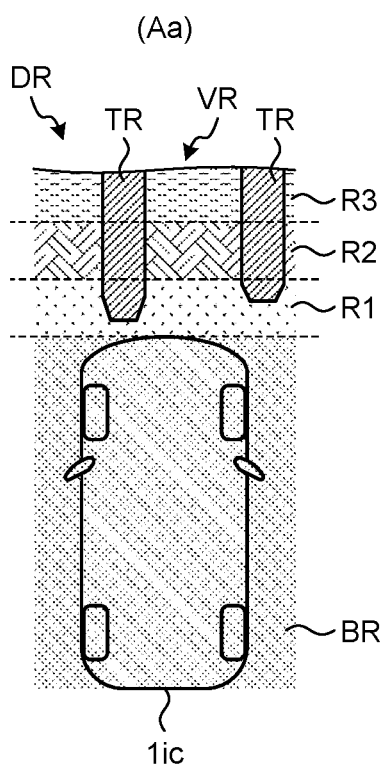
FIG. 5 is a schematic diagram illustrating an underfloor transmission display function included in the display ECU according to the embodiment.
Figure 5:
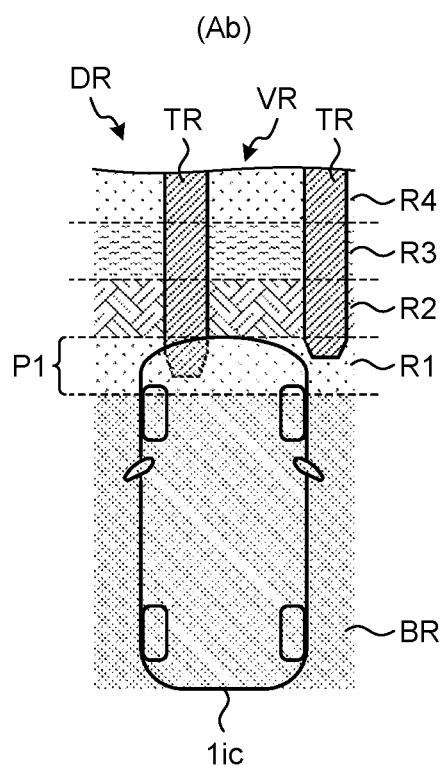
Figure 5:
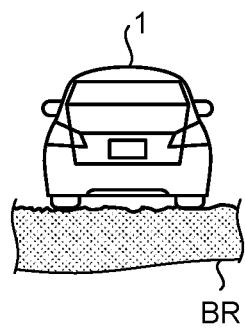
Figure 5:
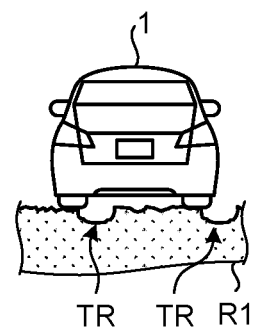
Figure 6:
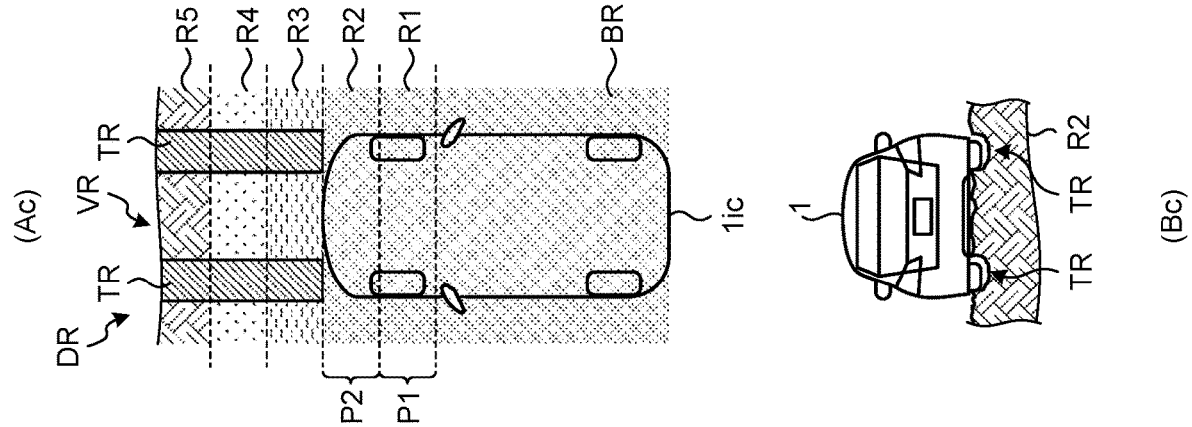
FIG. 6 is a schematic diagram illustrating the underfloor transmission display function included in the display ECU according to the embodiment.
Figure 6:
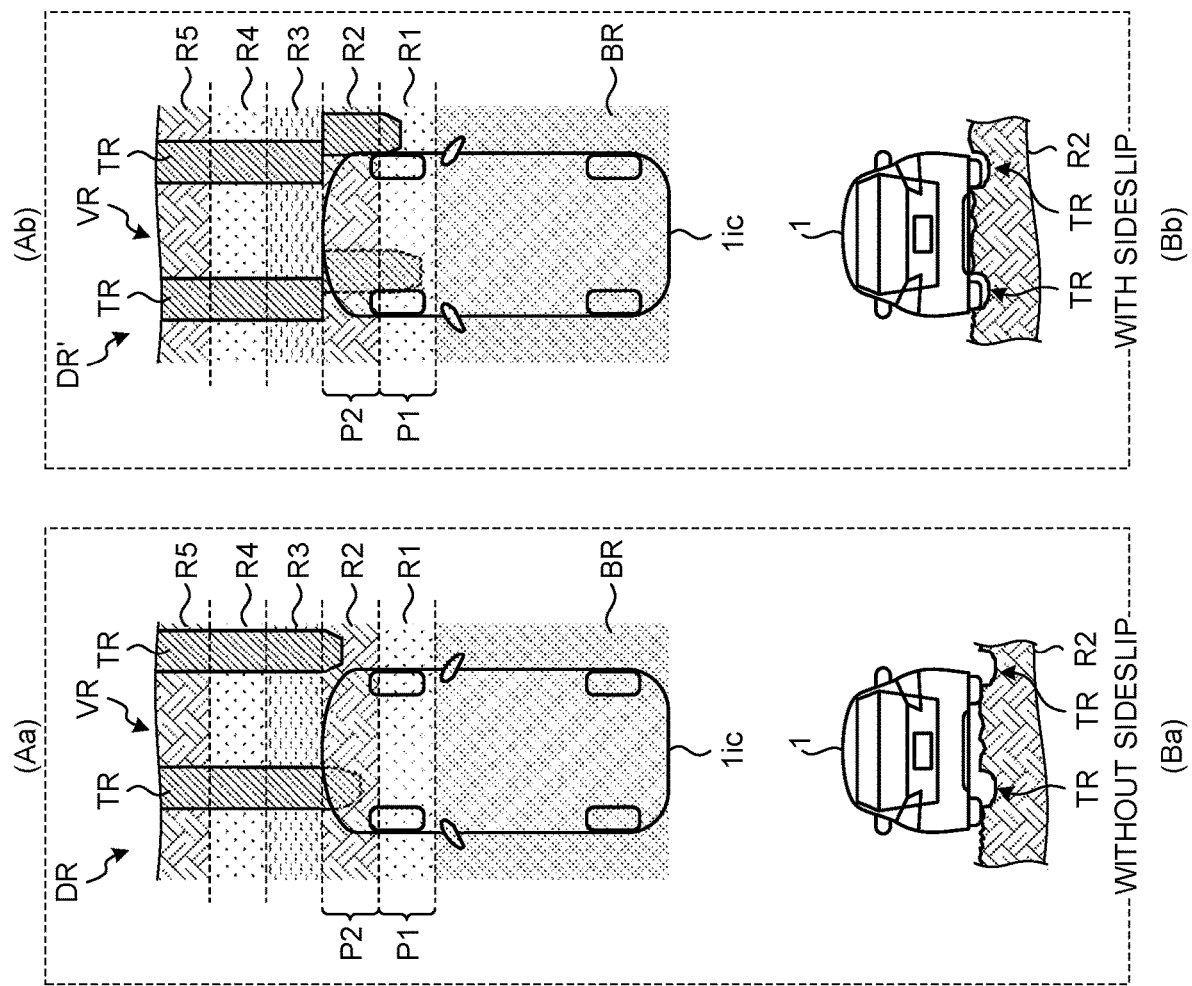
Figure 7:
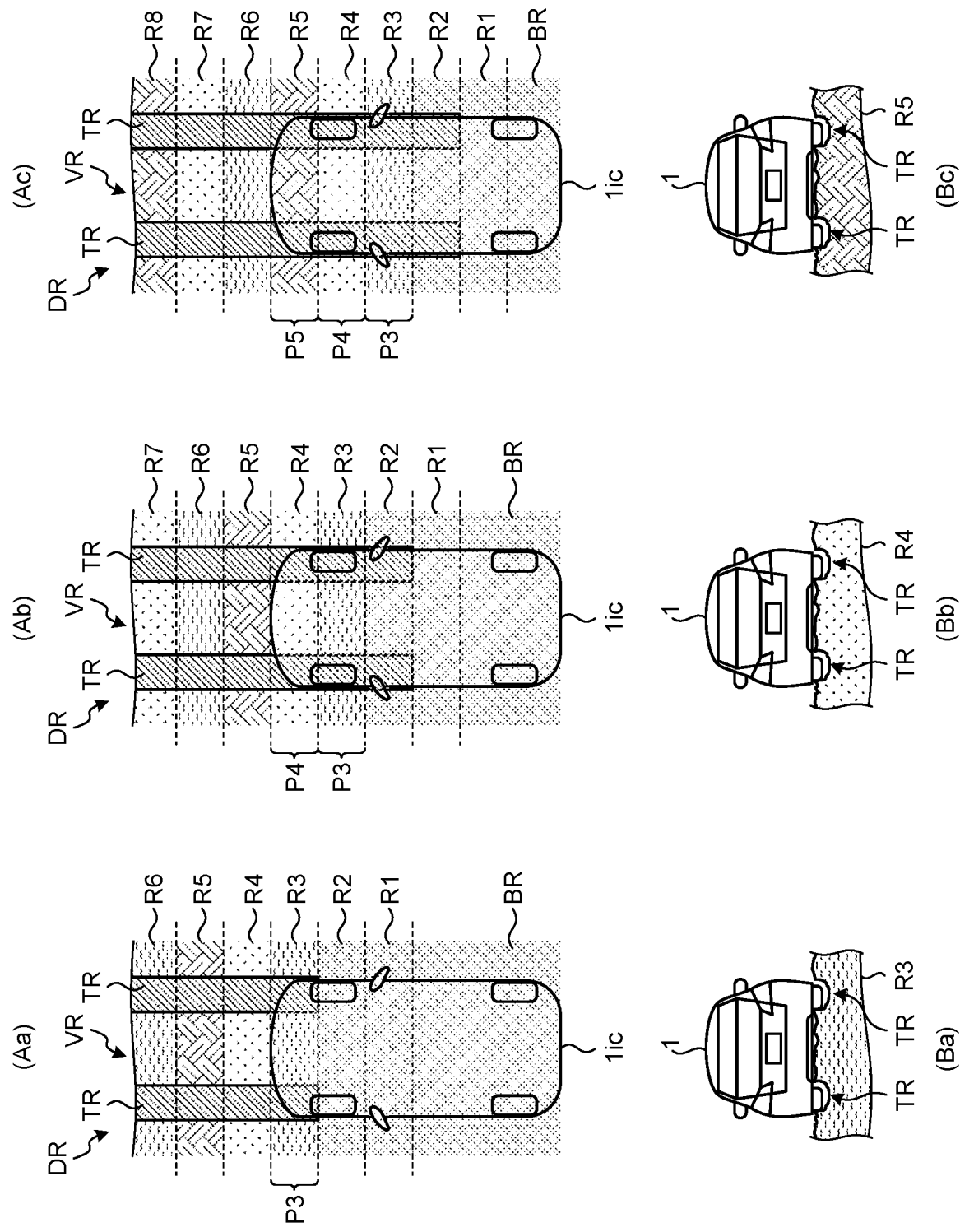
FIG. 7 is a schematic diagram illustrating the underfloor transmission display function included in the display ECU according to the embodiment.

Next, a more detailed functional example of the display ECU 10 will be described with reference to FIGS. 5, 6, and 7. FIGS. 5 to 7 are schematic diagrams illustrating the underfloor transmission display function of the display ECU 10 according to the embodiment.

FIGS. 5 to 7 each illustrate a state in which the display ECU 10 generates a plurality of display images DR in time series. FIG. 5 to FIG. 7 mainly illustrate the underfloor transmission display portion in the display image DR generated by the display image generation unit 104. However, the display image DR may include a bird's-eye view image of the periphery of the underfloor portion of the vehicle body 2, that is, a real-time image of the periphery of the vehicle.

In the generation of the bird's-eye view image, a plurality of captured images captured by a plurality of imaging devices can be used for combination, but in order to facilitate description, in FIG. 5 to FIG. 7, the bird's-eye view image is generated using only a captured image captured by the imaging device 61 located at the tip of the vehicle 1. Since the rear side of the tip of the vehicle 1 is not shown in the imaging device 61, the rear side of the tip of the vehicle 1 becomes a blind spot region in FIG. 5 to FIG. 7. In this blind spot region, there is a portion that does not hit the underfloor space of the vehicle 1, but it is referred to as underfloor transmission display in the sense that a range including the underfloor space is displayed as being transmitted.

When the display image including the underfloor transmission display of the vehicle body 2 is generated, there are a case where the generation processing of the display image is performed on the basis of absolute coordinates on the assumption that the road surface does not move and the vehicle 1 moves, and a case where the generation processing of the display image is performed with the vehicle 1 as reference coordinates on the assumption that the road surface moves with respect to the vehicle 1. Since there is no difference in the generated display image in any of the processing methods, an example of a case where the vehicle 1 is used as the reference coordinate will be described in the embodiment.

In addition, a vehicle icon added by the display control unit 106 may display the image of the vehicle body 2 in a semi-transparent manner or may display the shape of the vehicle body 2 in a simplified manner. In FIG. 5 to FIG. 7, an outer shape (contour line) of the vehicle body 2 and an image of the wheel 3 are illustrated as a vehicle icon 1ic in order to avoid complication of the drawings. FIG. 5 to FIG. 7 illustrate an image in which the vehicle icon 1ic is superimposed and displayed in a semi-transparent manner, but only a simplified contour line of the vehicle body 2 may be superimposed and displayed in a non-transparent manner.

In Part Aa of FIG. 5, it is assumed that an occupant of the vehicle 1 performs an operation of starting the underfloor transmission display on the HMI device 20. In this case, the bird's-eye view image generation unit 102 combines the latest captured images output from the imaging device 6 to generate the latest bird's-eye view image VR (that is, a real-time image). These types of processing by the bird's-eye view image generation unit 102 are continuously performed during the underfloor transmission display. At this time, the display control unit 106 may add the vehicle icon 1ic indicating the position of the vehicle 1 in the bird's-eye view image VR to the bird's-eye view image VR.

In addition, the bird's-eye view image VR includes an image of a region in front of the vehicle 1. A plurality of regions R1 to R3 in front of the vehicle 1 are image portions combined using the latest image at the time point of Part Aa of FIG. 5.

However, the plurality of regions R1 to R3 are not distinguished on the actual bird's-eye view image VR, and these classifications and different hatching applied to these regions R1 to R3 are for convenience of description. The plurality of regions R1 to R3 include images of two rows of ruts TR formed to extend forwards of the vehicle 1.

As illustrated in Part Aa of FIG. 5, in the initial state immediately after the underfloor transmission display is started, the display image generation unit 104 fills, for example, a blind spot region including the underfloor space of the vehicle body 2 with a black image region BR, and adds the black image region BR to the bird's-eye view image VR to generate the display image DR. Moreover, the display control unit 106 adds the vehicle icon 1ic to the display image. That is, the generated display image DR includes, for example, the bird's-eye view image VR (that is, the real-time image) obtained by combining the latest captured images, the black image region BR in which no image exists, and the vehicle icon 1ic.

Note that the black image region BR is obtained by filling a region having no image to be displayed with one color of black, and the same may be filled with gray or white instead of black. The term may be referred to as a gray zone or a white area according to the color, or may be simply referred to as a black image. In addition, when the vehicle icon 1ic is displayed in a semi-transparent manner, a portion of the black image region BR where the vehicle icon 1ic is superimposed and displayed is not necessarily black since the color of the vehicle icon 1ic overlaps the black image region BR.

Part Ba of FIG. 5 illustrates an actual state of the vehicle 1 at the time point of Part Aa of FIG. 5. Part Ba of FIG. 5 illustrates a state in which the vehicle 1 is viewed from the back for easy understanding of the state of the vehicle 1. On the other hand, Part Aa of FIG. 5 illustrates the display image VR in which a range centered on the tip of the vehicle 1 is viewed from above, and a relationship between an elevation view and a plan view is established.

Parts Ab and Bb of FIG. 5 illustrate the vehicle 1 moving forwards from the positions of Parts Aa and Ba of FIG. 5, respectively. As illustrated in Part Bb of FIG. 5, the vehicle 1 approaches the tip of the rut TR formed on the road surface. At this time, as illustrated in Part Ab of FIG. 5, the tip of the vehicle 1 moves beyond the region R1.

The movement of the vehicle 1 may include parallel movement and rotational movement. When the vehicle 1 travels straight forwards or rearwards, the movement of the vehicle 1 is parallel movement. When the vehicle 1 moves forwards or rearwards with a steering angle, the movement of the vehicle 1 is a combination of both the parallel movement and the rotational movement. Here, it is assumed that the vehicle 1 performs parallel movement in which the vehicle 1 linearly moves forwards.

As described above, when the vehicle 1 moves forwards and the tip portion moves beyond the region R1, the region R1 enters a blind spot of the imaging device 61 disposed at the tip of the vehicle 1.

As illustrated in Part Ab of FIG. 5, the bird's-eye view image generation unit 102 newly generates the bird's-eye view image VR (real-time image) including the regions R2 to R4 located in front of the vehicle 1 using the latest captured image at the time point of Part Ab of FIG. 5.

The estimation unit 105 estimates the movement direction and the movement amount of the vehicle 1 from the time point of Part Aa of FIG. 5 to the time point of Part Ab of FIG. 5 on the basis of detection results of the wheel speed sensor 4, the acceleration sensor 5, the steering angle sensor 8, and the like. In the example of Part Ab of FIG. 5, the estimation unit 105 estimates that the vehicle 1 has moved forwards by the vertical width of the region R1.

The past image generation unit 103 reads the bird's-eye view image VR in Part Aa of FIG. 5 generated at a time point going back by a predetermined time from the time point of Part Ab of FIG. 5 stored in the storage unit 108, and cuts out a range of the region R1 that is the blind spot at the time point of Part Ab of FIG. 5 from the read past bird's-eye view image to generate a past image P1. That is, the past image P1 is part of the image captured at the time point of Part Aa of FIG. 5 before the bird's-eye view image VR (real-time image) in Part Ab of FIG. 5.

The display image generation unit 104 combines the bird's-eye view image VR in Part Ab of FIG. 5 and the past image P1 generated by the past image generation unit 103, and generates a display image DR to which the display of the black image region BR is further added. At this time, the display image generation unit 104 moves the position of the past image P1 in the display image DR from the position of the region R1 in the display image DR in Part Aa of FIG. 5 according to the movement direction and the movement amount of the vehicle 1 estimated by the estimation unit 105, and displays the position at a position in contact with the bird's-eye view image VR. Since the range from which the past image P1 is cut out is determined according to the movement direction and the movement amount of the vehicle 1, the bird's-eye view image VR in Part Aa of FIG. 5 stored in the storage unit 108 may be moved according to the movement direction and the movement amount of the vehicle 1, and a portion not overlapping the bird's-eye view image VR (real-time image) in Part Ab of FIG. 5 may be used as the past image PT.

As described above, the vehicle 1 moves forwards by the vertical width of the region R1. Therefore, the display image generation unit 104 moves the past image P1 rearward of the vehicle 1 by the vertical width of the region R1 from the position of the region R1 in Part Aa of FIG. 5. As a result, the past image P1 moves to the position of the region R1 at the time point of Part Ab of FIG. 5. In addition, since the range in which there is no image to be displayed is narrowed due to the generation of the past image P1, the display image generation unit 104 narrows the range of the black image region BR.

As a result, the display image DR including the bird's-eye view image VR (real-time image) combined from the latest captured image at the time point of Part Ab of FIG. 5, the past image P1 captured at the time of Part Aa of FIG. 5 and fitted in the blind spot region, and the black image region BR narrowed by the past image P1 is generated. Note that, for example, the past image P1 is displayed in the display image DR through the vehicle icon 1*ic*.

Parts Aa and Ba of FIG. 6 illustrate a state in which the vehicle 1 further moves forwards from the positions of Parts Ab and Bb of FIG. 5, respectively. As illustrated in Part Ba of FIG. 6, the vehicle 1 is approaching the rut TR formed on the road surface, but the wheels 3 of the vehicle 1 including the front wheels 31 have not yet reached the tip of the rut TR. The tip portion of the vehicle 1 moves beyond the region R2, and the region R2 enters the blind spot of the imaging device 6 in addition to the region R1.

As illustrated in Part Aa of FIG. 6, the bird's-eye view image generation unit 102 newly generates a bird's-eye view image VR (real-time image) including a plurality of regions R3 to R5 located in front of the vehicle 1 using the latest image at the time point of Part Aa of FIG. 6.

The estimation unit 105 calculates the movement direction and the movement amount of the vehicle 1 from Part Ab of FIG. 5 to Part Aa of FIG. 6 on the basis of the detection results of the wheel speed sensor 4, the acceleration sensor 5, the steering angle sensor 8, and the like, and estimates that, for example, the vehicle 1 has moved forwards by the vertical width of the region R2.

The past image generation unit 103 generates a past image P2 by cutting out an image of the region R2 that becomes a new blind spot at the time point of Part Aa of FIG. 6 from the bird's-eye view image VR in Part Ab of FIG. 5 generated a predetermined time ago with respect to the bird's-eye view image VR (real-time image) in Part Aa of FIG. 6. That is, the past image P2 is an image generated on the basis of the captured image captured at the time point of Part Ab of FIG. 5, which is a predetermined time before the time point of Part Aa of FIG. 6.

The display image generation unit 104 combines the bird's-eye view image VR (real-time image) in Part Aa of FIG. 6, the past image P1 generated by the past image generation unit 103 at the time point of Part Ab of FIG. 5, and the past image P2 generated at the time point of Part Aa of FIG. 6, and generates the display image DR to which the display of the black image region BR is further added.

At this time, the display image generation unit 104 moves the position of the past image P1 in the display image DR from the position of the past image P1 in the display image DR in Part Ab of FIG. 5 toward the rear of the vehicle 1 by the vertical width of the region R2, which is the movement direction and the movement amount of the vehicle 1 estimated by the estimation unit 105.

Moreover, the display image generation unit 104 moves the position of the past image P2 in the display image DR from the position of the region R2 in the display image DR in Part Ab of FIG. 5 toward the rear of the vehicle 1 by the vertical width of the region R2, which is the movement direction and the movement amount of the vehicle 1 estimated by the estimation unit 105.

Through the above processing, the past image P1 moves to the position of the region R1 at the time point of Part Aa of FIG. 6, and the past image P2 moves to the position of the region R2 at the time point of Part Aa of FIG. 6. Note that instead of individually generating the past image P1 and the past image P2 as described above and then moving each of the past images P1 and P2, the past image P1 and the past image P2 may be processed together. For example, a composite image in which the bird's-eye view image VR (real-time image at that time) and the past image P1 are integrated may be generated at the time point of Part Ab of FIG. 5, the composite image may be moved by the vertical width of the region R2 which is the movement direction and the movement amount of the vehicle 1 estimated by the estimation unit 105 at the time point of Part Aa of FIG. 6, and a portion not overlapping the bird's-eye view image VR (real-time image) may be used as the past images P1 and P2 (past image P1+past image P2).

By any of the above processing, the display image DR including the bird's-eye view image VR obtained by combining the latest image at the time point of Part Aa of FIG. 6, the past image P1 captured at the time of Part Aa of FIG. 5 and fitted in the blind spot region, the past image P2 captured at the time of Part Ab of FIG. 5 and fitted in the blind spot region, and the black image region BR narrowed by the amount of the past images P1 and P2 fitted is generated. In the display image DR, for example, the semi-transparent vehicle icon 1*ic* is superimposed and displayed on the past images P1 and P2.

By repeating the above processing, the black image region BR used in the blind spot below the vehicle body 2 is gradually replaced with the past images P1, P2, etc., each being generated by cutting out part of the bird's-eye view image VR generated so far, and finally, all the black image regions BR are replaced with the past images, thereby obtaining the display image DR as if the underfloor space of the vehicle body 2 is visible.

Here, Parts Ab and Bb of FIG. 6 illustrate an example of a case where the wheel 3 falls into the rut TR due to the skid, which is different from the state of Parts Aa and Ba of FIG. 6. Part Bb of FIG. 6 illustrates a state after the wheel 3 falls into the rut TR when the vehicle 1 is traveling so as to cause the wheel 3 to pass through the left side of the rut TR. Note that the left and right references are the traveling direction of the vehicle 1, and the left hand and the right hand of the driver of the vehicle 1 are referred to as a left side and a right side, respectively.

Part Ab of FIG. 6 reflects the state of Part Bb of FIG. 6 and illustrates an example of the underfloor transmission display in a case where the wheel 3 falls into the rut TR immediately after the past images P1 and P2 are generated. As illustrated in Part Ab of FIG. 6, the rut TR appearing in the bird's-eye view image VR (real-time image) is displayed at a position overlapping the wheel 3 when the rut TR extends. However, the wheel 3 does not fall into the rut TR when the past images P1 and P2 are generated, so that the wheel 3 is on the left side of the rut TR on the past images P1 and P2. That is, the positional relationship between the bird's-eye view image VR (real-time image) and the past images P1 and P2 changes due to the skid of the vehicle 1, and a shift occurs in the joint.

For example, when viewed in the image of the rut TR, the rut TR is shifted to the left and right at the joint between the bird's-eye view image VR and the past images P1 and P2. This is because an image captured from the vehicle 1 after skidding is used as the bird's-eye view image VR, an image captured from the vehicle 1 before skidding is used as the past images P1 and P2, and there is movement in the lateral direction due to the skid between the images.

That is, in a display image DR' of Part Ab of FIG. 6, the past images P1 and P2 are shifted in the direction in which the vehicle 1 skids with respect to the bird's-eye view image VR, and it is difficult to grasp the positional relationship between the rut TR and the vehicle 1 after the skid. Specifically, when the past images P1 and P2 are viewed, since the wheel 3 does not fall into the rut TR, the occupant may believe what he or she sees in the display image and misunderstand that the wheel 3 does not fall into the rut TR.

In the display ECU 10 according to the embodiment, such a skid of the vehicle 1 is detected by the estimation unit 105. In a case where there is a mismatch in the rotation amount between the plurality of wheels 3, a mismatch between the rotation amount of the wheel 3 and the acceleration detected by the acceleration sensor 5, or the like in the detection results of the wheel speed sensor 4, the acceleration sensor 5, the steering angle sensor 8, and the like, the estimation unit 105 detects this mismatch as occurrence of a skid phenomenon. In addition, the magnitude of the mismatch may be referred to as a skid amount, and detection may be performed as occurrence of a skid phenomenon when the skid amount exceeds a predetermined value. This predetermined value is a threshold value at the time of evaluating the skid amount.

When the estimation unit 105 detects the skid phenomenon, the display image generation unit 104 generates the display image DR by applying processing indicating that the skid phenomenon has occurred to the past images P1 and P2 instead of the display image DR' illustrated in Part Ab of FIG. 6. An example of generating such a display image DR is illustrated in Part Ac of FIG. 6.

As illustrated in Part Ac of FIG. 6, when the skid phenomenon is detected, the display image generation unit 104 generates the display image DR by performing the processing of hiding the past images whose capturing times are before the occurrence time of the skid phenomenon among the past images P1 and P2 generated so far, namely, hiding both the past images P1 and P2 in the example of Part Ac of FIG. 6. The display image generation unit 104 extends the black image region BR to the range of the past images P1 and P2 that have not been displayed.

As described above, the processing of hiding the past images P1 and P2 is an example of the processing indicating that the skid phenomenon has occurred, which is performed on the past images P1 and P2. When the image in which the underfloor space of the vehicle 1 is not shown as illustrated in Part Ac of FIG. 6 is viewed, an imaginary force acts on the state of the underfloor portion that is not seen. Therefore, it can be estimated that the wheel 3 is fitted in the rut TR by comparing the position of the rut TR shown in the real-time image with the position of the wheel 3. However, when looking at an object that is visible, the human brain does not try to imagine what the object is. Therefore, when looking at the image in which the wheel 3 does not seem to fall into the rut TR as in Part Ab of FIG. 6, there is a possibility of misunderstanding that the current underfloor space of the vehicle 1 is in a state like the past image. That is, as illustrated in Part Ac of FIG. 6, by not displaying an image that does not match the state of the vehicle 1, it is possible to prevent an occupant from misunderstanding the state of the vehicle 1.

Parts Aa and Ba of FIG. 7 illustrate a state where the vehicle 1 moves forwards from the positions of Parts Ac and Bc of FIG. 6. As illustrated in Part Ba of FIG. 7, the vehicle 1 continues to move in a state of being stuck in the rut TR formed on the road surface. The tip portion of the vehicle 1 moves beyond the region R3, and the region R3 enters the blind spot of the imaging device 61 in addition to the regions R1 and R2.

As illustrated in Part Aa of FIG. 7, the bird's-eye view image generation unit 102 newly generates a bird's-eye view image VR (real-time image) including a plurality of regions R4 to R6 located in front of the vehicle 1 using the latest captured image at the time point of Part Aa of FIG. 7.

The estimation unit 105 calculates the movement direction and the movement amount of the vehicle 1 from Part Ac of FIG. 6 to Part Aa of FIG. 7 on the basis of the detection results of the wheel speed sensor 4, the acceleration sensor 5, the steering angle sensor 8, and the like, and estimates that, for example, the vehicle 1 has moved forwards by the vertical width of the region R3.

The past image generation unit 103 generates a past image P3 by cutting out an image of the region R3 that becomes a new blind spot at the time point of Part Aa of FIG. 7 from the bird's-eye view image VR in Part Ac of FIG. 6 generated a predetermined time ago with respect to the bird's-eye view image VR (real-time image) in Part Aa of FIG. 7. That is, the past image P3 is an image generated on the basis of the captured image captured at the time point of Part Ac of FIG. 6, which is a predetermined time before the time point of Part Aa of FIG. 7.

The display image generation unit 104 combines the bird's-eye view image VR in Part Aa of FIG. 7 and the past image P3 newly generated by the past image generation unit 103, and generates a display image DR to which the display of the black image region BR is further added.

At this time, the display image generation unit 104 moves the position of the past image P3 in the display image DR from the position of the region R3 in the display image DR in Part Ac of FIG. 6 to the rear side of the vehicle 1 by the vertical width of the region R3, which is the movement direction and the movement amount of the vehicle 1 estimated by the estimation unit 105. Through the above processing, the past image P3 moves to the position of the region R3 at the time point of Part Aa of FIG. 7.

Here, the past images having the capturing time before the occurrence time of the skid phenomenon, that is, the past images P1 and P2 captured at the times of Parts of Aa and Ab of FIG. 5, respectively, are not displayed. Therefore, it is not necessary to perform processing such as movement on the past images P1 and P2, but the display may be prohibited after performing processing such as movement. Note that, if the display is prohibited after processing such as movement is performed on the past image, in a case where the past image that has been erased according to a change in situation such as stopping of the vehicle is to be redisplayed, it is only necessary to cancel the display prohibition, and thus there is an advantage that redisplay processing is facilitated.

As a result of prohibiting the display of the past images P1 and P2, the display image DR including the bird's-eye view image VR obtained by combining the latest image at the time point of Part Aa of FIG. 7, the past image P3 captured at the time of Part Ac of FIG. 6 and fitted in the blind spot region, and the black image region BR narrowed from the black image region BR of Part Ac of FIG. 6 by the past image P3 is generated. Note that, for example, the past image P3 is displayed in the display image DR through the vehicle icon 1ic.

In Parts Ab and Ac of FIG. 7, by repeating the same processing as that in Part Aa of FIG. 7, the black image region BR assigned to the blind spot under the vehicle body 2 is replaced again with the past images P3, P4, and P5 generated by cutting out part of the bird's-eye view image VR generated after the occurrence time of the skid phenomenon, and finally, all the black image regions BR are replaced with the past images, thereby obtaining the display image DR as if the underfloor space of the vehicle body 2 is visible.

As described above, the display image generation unit 104 may perform the processing indicating the occurrence of the skid phenomenon only on one or more past images whose capturing time is before the occurrence of the skid phenomenon, and generate the display image DR in combination with the bird's-eye view image VR without performing the processing indicating the occurrence of the skid phenomenon on one or more past images whose capturing time is after the occurrence of the skid phenomenon even when the skid phenomenon is detected. This is because the past image generated after the occurrence time of the skid phenomenon is not shifted, and there is no risk of misunderstanding.

Note that, in FIGS. 5 to 7, an example in which the vehicle 1 linearly moves forwards has been described. However, the display image can be generated in the same manner as described above also in a case where the vehicle 1 moves rearwards and in a case where the vehicle 1 performs movement including rotational movement with a steering angle. In the case of movement with a steering angle, the movement of the vehicle 1 is specified by the movement distance and the rotation angle. As described above, the bird's-eye view image may be an entire peripheral image obtained by combining captured images from four directions, and in the case of the entire peripheral image, the blind spot region is a region under the vehicle body 2.

For example, when the vehicle 1 is moved forwards while the steering wheel is turned to the left, a region on the left front side of the road surface of the periphery of the vehicle 1 is located below the vehicle body 2 and becomes a blind spot from any imaging device 6. Therefore, a past image is generated by cutting out an image of a left front region of the vehicle from the past bird's-eye view image.

When the generated past image is combined with the bird's-eye view image, the representative point of the vehicle 1 is determined, and the generated past image may be moved according to the movement distance. The representative point of the vehicle 1 may be, for example, a midpoint of a line segment connecting the pair of rear wheels 32 of the vehicle 1.

The movement distance of the representative point determined in this manner is calculated as the movement distance of the vehicle 1, the past image is moved in parallel by the movement distance, and further rotationally moved by the rotation angle of the vehicle 1. As a result, the past image can be applied to a region that has become a blind spot due to movement of the vehicle 1.

By repeating the above processing while the vehicle 1 continues the movement with the steering angle, the black image region BR filling the blind spot region under the floor of the vehicle body 2 is sequentially replaced with the past image, and finally, all the black image regions BR are replaced with the past images, thereby obtaining a display image as if the underfloor space of the vehicle body 2 is visible.

Estimation Example of Movement of Vehicle

Next, a description will be given in detail as to a method of estimating the movement direction and the movement amount of the vehicle 1 performed by the estimation unit 105 of the display ECU 10 with reference to FIGS. 8 to 10.

As described above, the movement of the vehicle 1 includes the parallel movement and the rotational movement, and the movement of the vehicle 1 can be specified by the movement distance of the representative point of the vehicle 1 and the rotation angle about the representative point. As described above, the representative point of the vehicle 1 may be defined as, for example, the midpoint of the line segment connecting the pair of rear wheels 32.

The estimation unit 105 of the display ECU 10 estimates the movement direction and the movement amount of the vehicle 1 from, for example, the steering angle of the steering wheel and the wheel speed of each wheel 3. The steering angle of the steering wheel is obtained from the steering angle sensor 8 added to the steering wheel, and the wheel speed of each wheel 3 is obtained from the wheel speed sensor 4 added to each wheel 3.

In order to estimate the movement amount of the vehicle 1 from the wheel speed of each wheel 3, the estimation unit 105 first obtains the outer peripheral length of the wheel 3. The outer peripheral length of the wheel 3 is not determined only by the vehicle type and the type of the wheel 3, and varies with, for example, the air pressure of the wheel 3 and the outside air temperature at times. Therefore, it is preferable that the estimation unit 105 appropriately performs estimation by calculation. FIG. 8 illustrates a method of calculating the outer peripheral length of the wheel 3.

Figure 8:
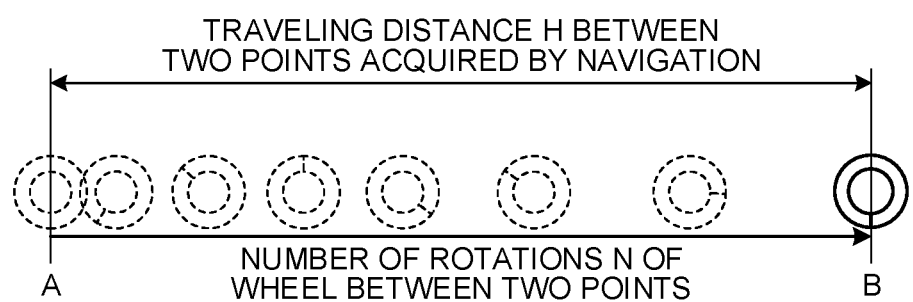
FIG. 8 is an explanatory diagram illustrating an example of a method of calculating the outer peripheral length of a wheel by the display ECU according to the embodiment.

FIG. 8 is an explanatory diagram illustrating an example of a method of calculating the outer peripheral length of the wheel 3 by the display ECU 10 according to the embodiment. Here, a navigation system of the vehicle 1 appropriately obtains position information of the vehicle 1 from a global navigation satellite system (GNSS).

As illustrated in FIG. 8, for example, the estimation unit 105 acquires, from the navigation system, information on the positions of any two points A and B where the vehicle 1 has traveled and a distance H between the two points A and B via the acquisition unit 101. These two points A and B may be, for example, intersections of two points where the vehicle 1 stops waiting for a traffic light. Note that if the road connecting the two points A and B includes many curves, an actual travel distance may be shorter than a distance between the two points on the map, and thus the two points A and B may be placed in a straight section of the road.

The estimation unit 105 calculates the number of rotations N of the wheel 3 between these two points A and B on the basis of the detection result of the wheel speed sensor 4 while the vehicle 1 travels from the point A to the point B. In addition, the estimation unit 105 obtains a value obtained by dividing the travel distance H of the vehicle 1 between the two points A and B by the number of rotations N of the wheel 3 between the two points A and B, thereby obtaining the outer peripheral length of the wheel 3.

At present, many vehicles are equipped with a navigation system as standard, and as described above, the HMI device 20 is commonly shared by the navigation system and the display ECU 10. Therefore, if the outer peripheral length of the wheel 3 is obtained by the above-described method using the navigation system, the outer peripheral length of the wheel 3 can be inexpensively and easily known without adding a device.

Note that the method of calculating the outer peripheral length of the wheel 3 as described above is an example, and the estimation unit 105 may obtain the outer peripheral length of the wheel 3 by a method other than the above-described method.

When the vehicle 1 travels straight in a predetermined section during the execution of the underfloor transmission display, the estimation unit 105 multiplies, for example, the outer peripheral length of the wheel 3 obtained as described above by the number of rotations of the wheel 3 when the vehicle 1 travels in the predetermined section. The number of rotations is not an integer but a numerical value having a fractional part. As a result, the movement amount of the vehicle 1 within the predetermined section can be calculated.

At the same time, the estimation unit 105 also estimates the movement amount in the rotation direction.

Figure 9:
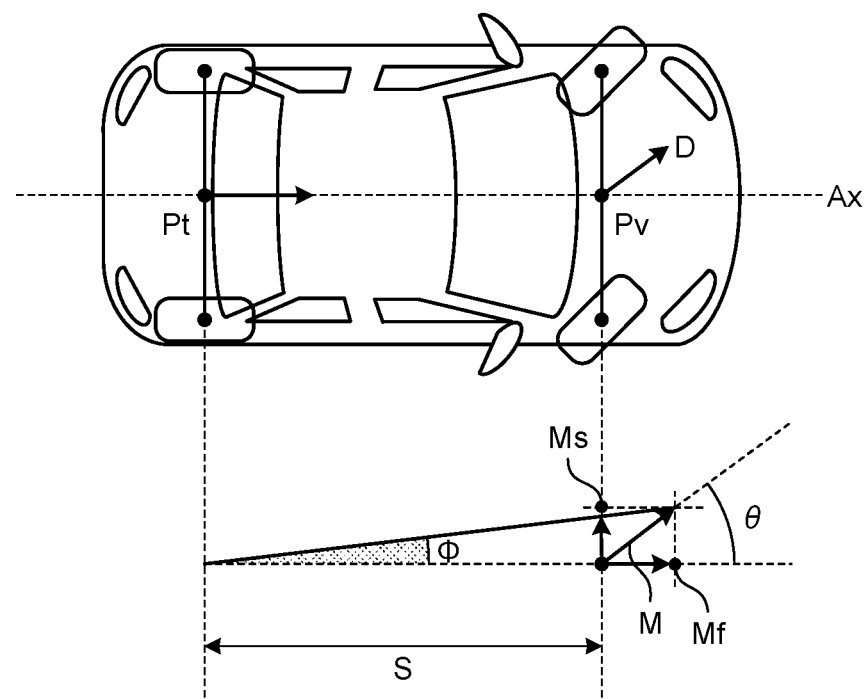
FIG. 9 is an explanatory diagram illustrating an example of a method of estimating the movement amount of a vehicle that performs movement with a steering angle by the display ECU according to the embodiment.
Figure 10A:
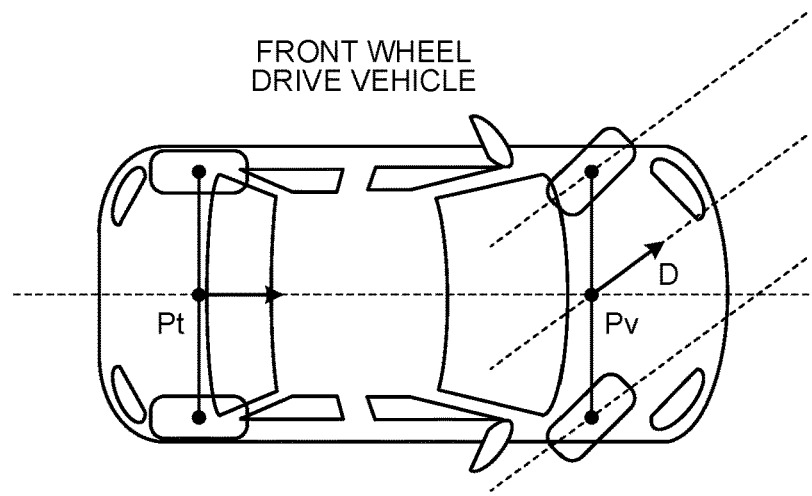
FIG. 10A is an explanatory diagram illustrating a difference in a movement direction due to a difference in drive wheels of the vehicle according to the embodiment.

FIG. 9 is an explanatory diagram illustrating an example of a method of estimating the movement amount of the vehicle 1 that performs movement with a steering angle by the display ECU 10 according to the embodiment.

As illustrated in FIG. 9, when the vehicle 1 is a front wheel drive vehicle, for example, a midpoint of a line segment connecting the pair of front wheels 31 may be set as a representative point Pv of the front wheels 31. The direction of a movement vector D of the representative point Pv of the front wheel 31 is a direction in which the front wheel 31 being a drive wheel is directed. The direction in which the front wheel 31 is directed can also be referred to as a direction orthogonal to the rotation axis of the front wheel 31.

Assume here that a line segment connecting the representative point Pv of the front wheel 31 and a representative point Pt of the vehicle 1 is defined as a forward-and-rearward axis Ax of the vehicle 1, an angle formed by the forward-and-rearward axis Ax of the vehicle 1 and a direction of the movement vector D of the front wheel 31 of the vehicle 1 is defined as an angle $\theta$, and a movement distance of the representative point Pv of the front wheel 31 is defined as M. On this assumption, a distance Mf by which the representative point Pv of the front wheel 31 advances in a direction of the forward-and-rearward axis Ax of the vehicle 1 is expressed by Mf=M·cos $\theta$, and a distance Ms by which the representative point Pv of the front wheel 31 advances in a direction orthogonal to the forward-and-rearward axis Ax of the vehicle 1 is expressed by Ms=M·sin $\theta$.

Moreover, an angle $\phi$ (rotation angle $\phi$) at which the vehicle 1 has rotated about the representative point Pv by the movement of the vehicle 1 in the direction orthogonal to the forward-and-rearward axis Ax of the vehicle 1 at the representative point Pv of the front wheel 31 can be obtained by #=arctan (Ms/S) using an inverse function of tangent, where S is a distance between the front wheel 31 and the rear wheel 32.

As described above, the rotation amount of the vehicle 1 moving with the steering angle can be estimated. The skid amount of the wheel 3 in the forward-and-rearward direction can also be estimated by obtaining a movement amount Mt of the representative point Pt of the rear wheel 32 and a difference between the distance Mf by which the representative point Pv of the front wheel 31 advances in the direction of the forward-and-rearward axis Ax of the vehicle 1 and Mt=(Mf−Mt). Generally, since the number of rotations of the drive wheel is higher than the number of rotations of the driven wheel, Mf>Mt is obtained in the case of the front wheel drive, and Mt>Mf is obtained in the case of the rear wheel drive. If all the wheels 3 grip the road surface, an absolute value of (Mf−Mt) remains small, but when the absolute value of (Mf−Mt) is large, determination may be made such that there is a skid phenomenon like a spin of the drive wheel.

When the movement direction of the representative point Pv of the front wheel 31 is estimated, the direction in which the front wheel 31 specified from the detection result of the steering angle sensor 8 is directed is used as a reference, but the direction in which the representative point Pv of the front wheel 31 actually moves varies with which of the wheels 3 is the drive wheel. FIG. 10 illustrates an example of a difference in the movement direction by the drive wheel.

FIGS. TOA to 10C are explanatory diagrams illustrating a difference in the movement direction of the representative point Pv of the front wheel 31 due to a difference in the drive wheel of the vehicle 1 according to the embodiment.

FIG. TOA is an example of a case where the vehicle 1 is a front wheel drive vehicle. In this case, since the two rear wheels 32 are not conjunction with each other and rotate independently, no force against the rotation of the vehicle body is generated. Therefore, as described above, the representative point Pv of the front wheel 31 moves in the direction in which the front wheel 31, which is a drive wheel, is directed.

Figure 10B:
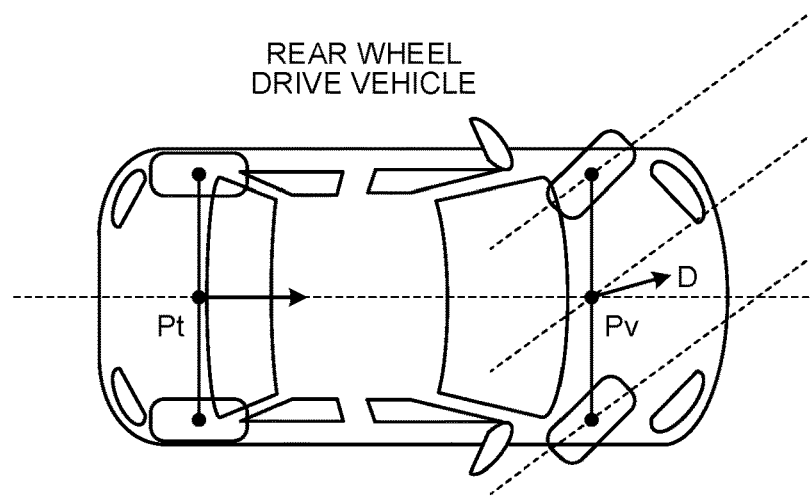
FIG. 10B is an explanatory diagram illustrating a difference in the movement direction due to the difference in the drive wheels of the vehicle according to the embodiment.

FIG. 10B illustrates an example in which the vehicle 1 is a rear wheel drive vehicle. Since the left and right rear wheels 32, which are drive wheels, are mechanically connected to one engine, the same tends to rotate at the same number of rotations in conjunction with one another. In other words, the two rear wheels try to travel the same distance. Therefore, when the vehicle 1 is to be rotated, a force for causing the vehicle 1 to travel straight, in other words, a reaction force for preventing the vehicle 1 from being rotated is generated. A vehicle having a large reaction force is called a vehicle having high straightness. In a case where the vehicle 1 is a rear wheel drive vehicle, even if the representative point Pv of the front wheel 31 tries to move in the direction in which the front wheel 31 is directed, there is a reaction force against this. Therefore, the direction in which the representative point Pv of the front wheel 31 moves is a direction slightly shifted from the direction in which the front wheel 31 is directed to the straight traveling direction.

Figure 10C:
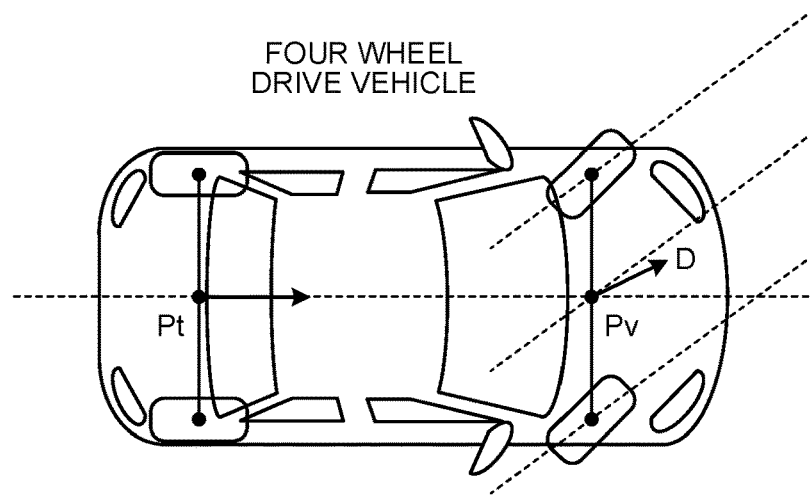
FIG. 10C is an explanatory diagram illustrating a difference in the movement direction due to the difference in the drive wheels of the vehicle according to the embodiment.

FIG. 10C illustrates an example in which the vehicle 1 is a four-wheel drive vehicle. In a case where the vehicle 1 is a four-wheel drive vehicle, the movement direction of the representative point Pv of the front wheel 31 is often somewhere between the movement direction in a case where the vehicle 1 is a front wheel drive vehicle and the movement direction in a case where the vehicle 1 is a rear wheel drive vehicle. The movement direction varies with various conditions.

For example, in a case where the center of gravity of the vehicle 1 is slightly close to the front and a load applied to the front wheel 31 is larger than a load applied to the rear wheel 32, the movement direction of the representative point Pv of the front wheel 31 is slightly close to the direction in which the front wheel 31 is directed. In a case where the center of gravity of the vehicle 1 is close to the rear and the load applied to the rear wheel 32 is larger than the load applied to the front wheel 31, the straight traveling performance is enhanced, so that the movement direction of the representative point Pv of the front wheel 31 is close to the movement direction in a case where the vehicle 1 is a rear wheel drive vehicle. In addition, for example, in a case where the front wheel 31 is on the icy road and loses its grip on the road surface, and only the rear wheel 32 grips the road surface, the movement direction of the representative point Pv of the front wheel 31 may be the straight traveling direction. In such a case, the number of rotations of the two rear wheels 32 is the same even though the steering angle is applied. Therefore, determination can be made such that the front wheel 31 is skidding (that is, the skid phenomenon has occurred).

As described above, the movement direction of the vehicle 1 may be shifted from the direction in which the front wheel 31 is directed, and a shift in the movement direction, that is, an angle difference tends to increase as a steering angle increases. Such a shift in the movement direction can be included in the skid phenomenon described above. In this case, the skid phenomenon is more likely to occur as a friction coefficient μ of the road surface is lower and a steering angle is larger. The friction coefficient μ represents the difficulty of skid between objects, and the friction coefficient μ when 1 kg of force is required to pull a weight of 1 kg is set to 1.

The skid phenomenon can also occur when the vehicle 1 travels straight. In this case, the movement amount of the wheel 3 does not coincide with the movement amount of the vehicle 1. As described above, the skid phenomenon includes a case where the movement direction of the vehicle 1 is shifted from the direction in which the front wheel 31 is directed, a case where the movement direction of the vehicle 1 is shifted from the direction indicated by the steering angle, and the like.

That is, there is a case where the movement amount of the wheel 3 does not coincide with the movement amount of the vehicle 1 or the movement direction of the vehicle 1 does not coincide with the direction indicated by the steering angle depending on the conditions of the road surface, the vehicle speed, the steering angle, and the like. In this case, the movement direction and the movement amount of the vehicle 1 cannot be accurately estimated only by output values from various sensors such as the wheel speed sensor 4 and the steering angle sensor 8. Such a phenomenon can be regarded as the skid phenomenon.

Example of Method of Detecting Skid Phenomenon

Next, a description will be given in detail as to a method of detecting a skid phenomenon of the vehicle 1 performed by the estimation unit 105 of the display ECU 10 with reference to FIGS. 11 and 12.

The estimation unit 105 of the display ECU 10 detects the skid phenomenon occurring in the vehicle 1 by, for example, collating the wheel speed obtained from each wheel 3 with the acceleration of the vehicle 1 obtained from the acceleration sensor 5.

When the steering angle of the vehicle 1 is zero and no skid phenomenon occurs on the wheels 3, the wheel speeds obtained from the respective wheels 3 substantially match each other. In addition, when the steering angle of the vehicle 1 is not zero, an inner wheel difference occurs according to the steering angle, and a difference in wheel speed occurs in each wheel 3. However, when no skid phenomenon occurs, the difference in wheel speed maintains a predetermined relationship according to the steering angle. Therefore, when no skid phenomenon occurs in the vehicle 1, the estimation unit 105 can approximately correctly estimate the movement amount and the movement direction of the vehicle 1.

For example, when the vehicle 1 turns while maintaining a constant steering angle, the vehicle 1 rotates about a point on a line extending the axle of the rear wheel 32, and the radius of a circle on which each wheel 3 moves is determined by the steering angle. When all the wheels 3 grip the road surface and no skid phenomenon occurs, the wheel speed observed at each wheel 3 is proportional to the radius of the circle on which each wheel 3 moves, so that the difference between the wheel speeds (inner wheel difference) is determined by a rotation radius of the vehicle 1. Since the rotation radius is determined by the steering angle, it can be said that the inner wheel difference is determined by the steering angle. When the inner wheel difference determined by the steering angle and the difference between the wheel speeds observed in the respective wheels 3 match each other within a predetermined range, it may be estimated that no skid phenomenon has occurred.

On the other hand, when a skid phenomenon occurs in any one of the wheels 3, the difference between the wheel speeds generated in the respective wheels 3 is shifted from a predetermined relationship. For example, when the vehicle 1 is a rear wheel drive vehicle and the grip between the front wheel 31 and the road surface is weak and the vehicle 1 sideslips, the vehicle 1 turns with a rotation radius larger than the rotation radius determined by the steering angle. Then, since the difference between the wheel speeds observed in the respective wheels 3 (an actual measurement value of the inner wheel difference) is different from the difference between the wheel speeds when the vehicle 1 turns at the rotation radius determined by the steering angle (a theoretical value of the inner wheel difference), the estimation unit 105 can detect the skid phenomenon occurring in the vehicle 1 by comparing the difference (the difference between the theoretical value of the inner wheel difference calculated from the steering angle and the actual measurement value of the inner wheel difference) with a predetermined threshold value.

In addition, the estimation unit 105 may detect a skid phenomenon on the basis of a detection result of the acceleration sensor 5. For example, in the vehicle 1 of the embodiment, the skid phenomenon can be detected by collating detection results of the acceleration sensors 51 and 52 in front of and behind the vehicle 1.

As an example, a description will be given as to a behavior of the vehicle 1 and detection results of the acceleration sensors 51 and 52 when the vehicle 1 is suddenly braked in the middle of rotational movement. When the vehicle 1 stops without losing the grip of each wheel 3 on the road surface, the acceleration due to the sudden braking reaches a peak at the front and rear acceleration sensors 51 and 52 at the same time.

However, when a posture change of the vehicle body 2 (the inertial force of the vehicle body 2 pushes down the front wheel 31, and the rear wheel 32 side of the vehicle body 2 rises in reverse) called nose dive occurs due to deceleration, a road surface load of the front wheel 31 increases and a road surface load of the rear wheel 32 decreases. Then, the front wheel 31 grips the road surface while the rear wheel 32 loses its grip on the road surface, and the rear portion of the vehicle body 2 may sideslip due to centrifugal force. In this case, the acceleration in the lateral direction observed by the acceleration sensor 52 at the rear portion is small while the rear wheel 32 sideslips, and reaches a peak when the rear wheel 32 recovers the grip.

The sideslip mentioned here is an example of the skid phenomenon. Since the sideslip is a phenomenon that occurs to a greater or lesser extent when the vehicle 1 travels with a steering angle, it is not necessary to determine that a skid phenomenon has occurred when a skid amount described later is smaller than a predetermined value in the sideslip.

When the rear wheels 32 sideslip and exhibit the behavior as described above, the front portion of the vehicle body 2 approaches the stop state earlier than the rear portion of the vehicle body 2 (since the rear portion of the vehicle body 2 sideslips, the vehicle body 2 does not completely stop). Therefore, the peak of the acceleration observed by the acceleration sensor 51 at the front portion of the vehicle body 2 is observed earlier than the peak of the acceleration observed by the acceleration sensor 51 at the rear portion. In this manner, the estimation unit 105 can detect the skid phenomenon (sideslip in this example) on the basis of a difference in timing of observing the peak of the acceleration between the front portion and the rear portion of the vehicle 1.

Moreover, the estimation unit 105 may detect the skid phenomenon on the basis of only the detection result of one acceleration sensor (for example, one of 51 and 52). FIGS. 11A to 12B illustrate an example of a method of detecting a skid phenomenon using a detection result of one acceleration sensor 5.

FIGS. 11A to 12B are explanatory diagrams illustrating an example of a method of detecting a skid phenomenon on the basis of a detection result of the acceleration sensor 5 by the display ECU 10 according to the embodiment. The horizontal axes of the graphs in FIGS. 11A to 12B all indicate the passage of the time T. In FIGS. 11A to 12B, the vertical axis of each graph excluding FIG. 12A represents the acceleration in the lateral direction (lateral G) detected by the acceleration sensor 5. The vertical axis of the graph of FIG. 12A indicates the detection result of the steering angle sensor 8, that is, the steering angle.

Figure 11A:
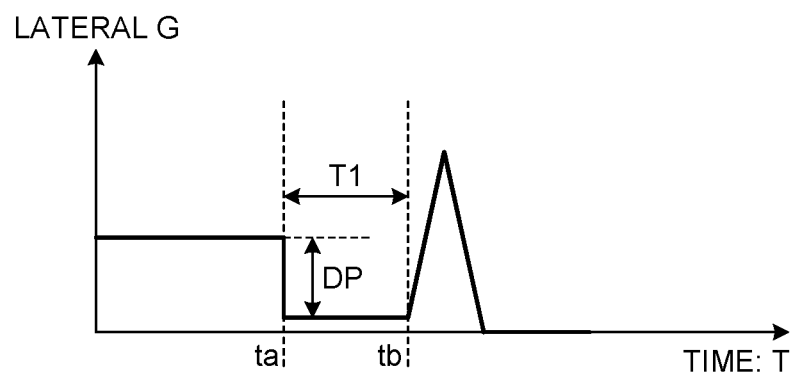
FIG. 11A is an explanatory diagram illustrating an example of a method of detecting a skid phenomenon on the basis of a detection result of an acceleration sensor by the display ECU according to the embodiment.
Figure 11B:
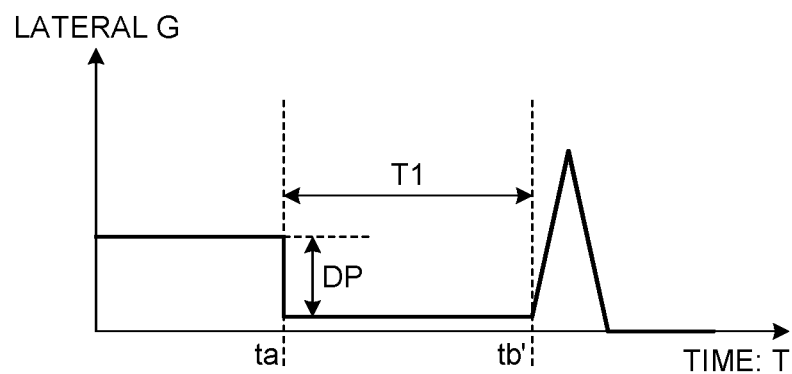
FIG. 11B is an explanatory diagram illustrating an example of the method of detecting a skid phenomenon on the basis of the detection result of the acceleration sensor by the display ECU according to the embodiment.

For example, FIGS. 11A and 11B illustrate a temporal change in acceleration detected by the acceleration sensor 5 when a vehicle turns at a steering angle on the road surface covered with snow in a pressed snow state, and sideslip occurs at the time ta. Centrifugal force is generated in the vehicle 1 when the vehicle 1 is turned by the inertial force of the vehicle 1, and the wheel 3 grips the road surface against the centrifugal force until the sideslip occurs at the time ta, so that the centrifugal force is detected by the acceleration sensor 5. It may be said that the acceleration sensor 5 detects the force transmitted from the wheel 3 to the road surface as the lateral G.

When sideslip starts at the time ta, the lateral G detected by the acceleration sensor 5 decreases. Although the wheel 3 loses the grip and the friction coefficient μ between the road surface and the wheel 3 decreases, the friction force is slightly transmitted to the road surface, so that the vehicle 1 moves while gradually reducing the speed. Since the force received by the vehicle 1 is small while the vehicle 1 is skidding, the lateral G detected by the acceleration sensor 5 becomes small. When the wheel 3 recovers the grip (time tb in FIG. 11A, and time tb' in FIG. 11B), the force transmitted from the wheel 3 to the road surface increases, so that the lateral G detected by the acceleration sensor 5 increases again. That is, a period during which the lateral G is small is a period during which the vehicle sideslips. This may be referred to as a skid period T1. The skid period T1 is evaluated by the length of time of the period, so that the same may be reworded as a skid time.

In a case where the skid phenomenon is not determined when the skid period T1 is equal to or less than a predetermined value, and the skid phenomenon is detected when the skid period T1 exceeds the predetermined value, a time point at which the skid phenomenon is detected is later than a time point at which the skid phenomenon occurs (ta in FIGS. 11A and 11B). In principle, the range of the past image whose display is restricted when the skid phenomenon occurs should be the past image whose capturing time is before the occurrence time of the skid phenomenon. However, as practical application, the time point at which the skid phenomenon is detected may be regarded as the time point at which the skid phenomenon occurs.

For example, in FIG. 11A, in the image captured immediately after the occurrence of the skid phenomenon (slightly after the time ta), the positional shift of the image due to the skid is small, and thus, it is considered that the possibility of being misunderstood by an occupant is small. In addition, in many cases, since there is no large difference between the time point at which the skid phenomenon is detected and the time point at which the skid phenomenon occurs, it is not necessary to distinguish between the time points.

The skid period T1 is illustrated in the graphs of FIGS. 11A and 11B. FIG. 11A illustrates a case where the skid period T1 is relatively short, and FIG. 11B illustrates a case where the skid period T1 is relatively long. In general, it can be said that the longer the skid period T1, the longer the skid distance of the vehicle body 2. In addition, since the centrifugal force increases as the vehicle speed increases, the drop amount of the acceleration when the grip is lost also increases. Therefore, it is estimated that a skid speed, which is the speed of the skidding vehicle body 2, increases as the drop amount DP of the acceleration immediately after the start of the skid illustrated in the graphs of FIGS. 11A and 11B increases. Therefore, for example, assuming that a speed at which the vehicle body 2 skids is defined as a skid speed V1, the skid speed V1 can be estimated as follows.

$$\text{Skid speed } VT = \text{proportionality factor } K \times \text{drop amount } DP \text{ of acceleration} \quad (1)$$

For example, assuming that a skid distance of the vehicle body 2 is defined as a skid width L1, the skid width L1 can be estimated as follows by adding the skid period T1 to the above Equation (1).

$$\text{Skid width } L1 = \text{skid speed } V1 \times \text{skid period } T1 \quad (2)$$

The display ECU 10 according to the embodiment estimates the skid period T1, the skid speed V1, or the skid width L1 in the skid phenomenon, compares either one with a predetermined threshold value, and determines a processing content by the display image generation unit 104.

Then, in a case where the skid period T1, the skid speed V1, or the skid width L1 is less than the predetermined threshold value, the display image is generated without performing processing indicating that a skid phenomenon has occurred. In addition, in a case where the skid period T1, the skid speed V1, or the skid width L1 is equal to or greater than the predetermined threshold value, processing indicating that a skid phenomenon has occurred is performed on one or more past images.

The processing indicating that a skid phenomenon has occurred may be either processing of hiding the one or more past images or processing of adding an indication indicating that a skid phenomenon has occurred. The processing of adding the indication indicating that the skid phenomenon has occurred will be described later.

Figure 12A:
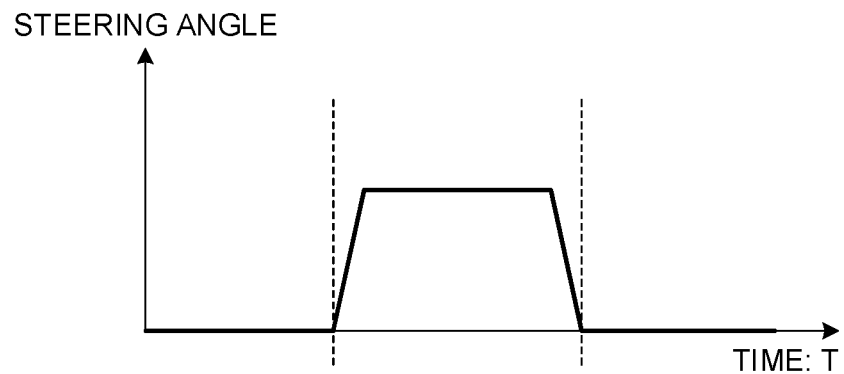
FIG. 12A is an explanatory diagram illustrating an example of the method of detecting a skid phenomenon on the basis of the detection result of the acceleration sensor by the display ECU according to the embodiment.
Figure 12B:
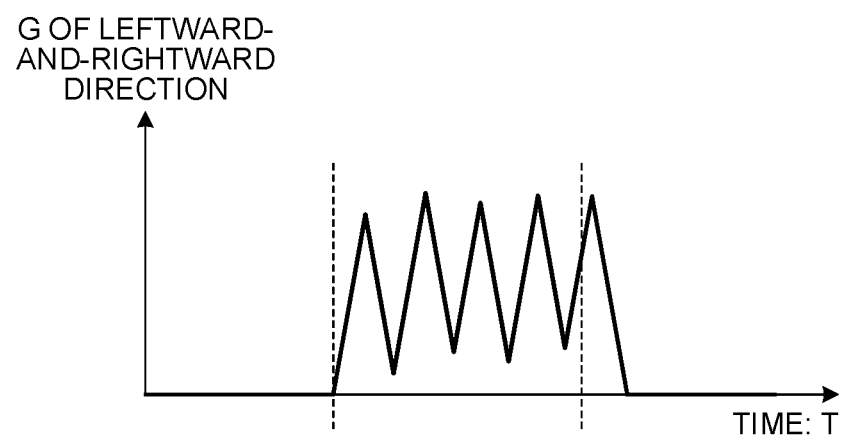
FIG. 12B is an explanatory diagram illustrating an example of the method of detecting a skid phenomenon on the basis of the detection result of the acceleration sensor by the display ECU according to the embodiment.

FIG. 12A illustrates the steering angle of the vehicle 1 passing through a curve with the steering angle, and FIG. 12B illustrates the acceleration of the same vehicle 1 passing through the curve with the steering angle. FIGS. 12A and 12B are examples of temporal changes in the steering angle and the acceleration when sideslip occurs intermittently in the vehicle 1 when the vehicle 1 passes through a curve.

When no skid phenomenon occurs in the vehicle 1, a centrifugal force corresponding to the speed and the rotation radius of the vehicle 1 acts on the vehicle 1. When no skid phenomenon occurs in the vehicle 1, an output value from the acceleration sensor 5 becomes a graph similar to a change in the steering angle illustrated in FIG. 12A, and a theoretical value of the centrifugal force calculated from the steering angle and the vehicle speed substantially coincides with the acceleration.

As shown in FIG. 12B, when sideslip occurs intermittently, the acceleration sensor 5 repeats detection or nondetection of centrifugal force. Therefore, when the actual output value of the acceleration sensor 5 illustrated in FIG. 12B is significantly different from the theoretical value of the centrifugal force calculated from the steering angle and the vehicle speed, it can be estimated that the vehicle 1 sideslips intermittently.

Such intermittent sideslip may occur when, for example, the vehicle 1 is traveling on an unpaved road surface or the like. When the road surface is unpaved, the grip between the road surface and the wheel 3 is not constant. Therefore, the acceleration in the leftward-and-rightward direction intermittently fluctuates as in the graph of FIG. 12B. In the graph of FIG. 12B, for example, it is estimated that the sideslip of the wheel 3 occurs at a valley portion.

Not only the intermittent sideslip but also an intermittent longitudinal skid may occur in the vehicle 1. The intermittent longitudinal skid may occur when, for example, the vehicle 1 travels while scratching the muddy ground. When the longitudinal skid occurs intermittently, the longitudinal skid can be detected from a mismatch between the output value of the acceleration sensor 5 and the theoretical value of the acceleration calculated from the wheel speed.

For example, when the wheel speed increases while the wheel 3 grips the road surface, the vehicle 1 should be accelerating, and the acceleration can be calculated from the temporal change of the wheel speed. However, when the wheels 3 are skidding on the muddy ground, the vehicle 1 does not accelerate even if the wheel speed increases, and thus, a large difference occurs between the acceleration calculated from the wheel speed and the acceleration output by the acceleration sensor 5.

Moreover, when the vehicle 1 continues to be not accelerated even when the wheels 3 rotate, determination may be made such that continuous longitudinal skid occurs. Moreover, when the vehicle is suddenly braked on the icy road and the wheel speed becomes zero without detecting a large acceleration, the vehicle speed does not become zero, and it can be estimated that the vehicle 1 is skidding on the icy road. Therefore, determination may be made such that continuous longitudinal skid occurs.

As described above, in a case where the skid phenomenon occurs continuously or intermittently and it is difficult to specify the occurrence time of the skid phenomenon or in a case where the skid phenomenon continues for a long time, it is not appropriate to perform processing indicating that the skid phenomenon has occurred in part of the past image. Therefore, for example, when the estimation unit 105 detects a continuous or intermittent skid phenomenon, the display image generation unit 104 may perform processing indicating that the skid phenomenon has occurred in all the past images to be displayed in combination with the bird's-eye view image.

In addition, as in the example illustrated in FIGS. 5 to 7 described above, when the wheel 3 of the vehicle 1 moving on the edge of the rut TR falls into the rut TR, the acceleration sensor 5 detects the acceleration in the lateral direction (lateral G) and the downward acceleration. The estimation unit 105 may detect that some sort of skid phenomenon has occurred in the vehicle 1 from the acceleration in the vertical direction.

In such a case where the wheel 3 falls into the deep rut TR, when the wheel 3 falls into the rut TR, a distance between the imaging device 6 attached to the vehicle body 2 and the road surface becomes short. Then, since the road surface directly below the imaging device 6 appears larger than other portions on the bird's-eye view image, the position and width of the rut TR are different from those of the bird's-eye view image before the wheel 3 falls into the rut TR, and the bird's-eye view image cannot be a continuous composite image without a shift.

Therefore, the estimation unit 105 may specify the skid amount in the horizontal direction and the movement amount in the vertical direction, and in a case where the skid amount is equal to or greater than a predetermined value, correct a shift of the image due to the horizontal movement when there is no movement in the vertical direction, and perform processing of not displaying the past image before occurrence of the skid phenomenon when there is movement in the vertical direction of a predetermined value or more. Note that, in the display ECU 10 according to the embodiment, regardless of the presence or absence of movement in the vertical direction, processing of prohibiting the above-described display is performed instead of image shift correction.

As described above, the display ECU 10 according to the embodiment can determine that any one of the wheels 3 has skidded on the condition that, for example, a difference in wheel speed exceeds a predetermined value, a difference in peak observation time in the front and rear acceleration sensors 51 and 52 exceeds a predetermined value, or the drop amount DP of acceleration exceeds a predetermined value, or the skid speed V1 obtained by the above Equation (1) becomes equal to or greater than a predetermined threshold value, or the skid period T1 becomes equal to or greater than a predetermined threshold value, or the skid width L1 obtained by the above Equation (2) becomes equal to or greater than a predetermined threshold value, or a difference between the theoretical value of the inner wheel difference calculated from the steering angle and the actual measurement value of the inner wheel difference exceeds a predetermined value, or a difference between the acceleration calculated from the wheel speed and the observed acceleration exceeds a predetermined value, and perform processing by the display image generation unit 104 as illustrated in FIGS. 5 to 7.

In addition to the above description, for example, in a case where sudden braking is applied to the vehicle 1 or under a condition where a large acceleration can occur in the lateral direction, the estimation unit 105 may estimate that a skid phenomenon has occurred. The condition under which large acceleration can occur in the lateral direction is a condition under which sideslip may occur in the vehicle 1, and is, for example, a case where the product of the vehicle speed and the steering angle exceeds a certain value.

Processing Example of Display ECU

Figure 13:
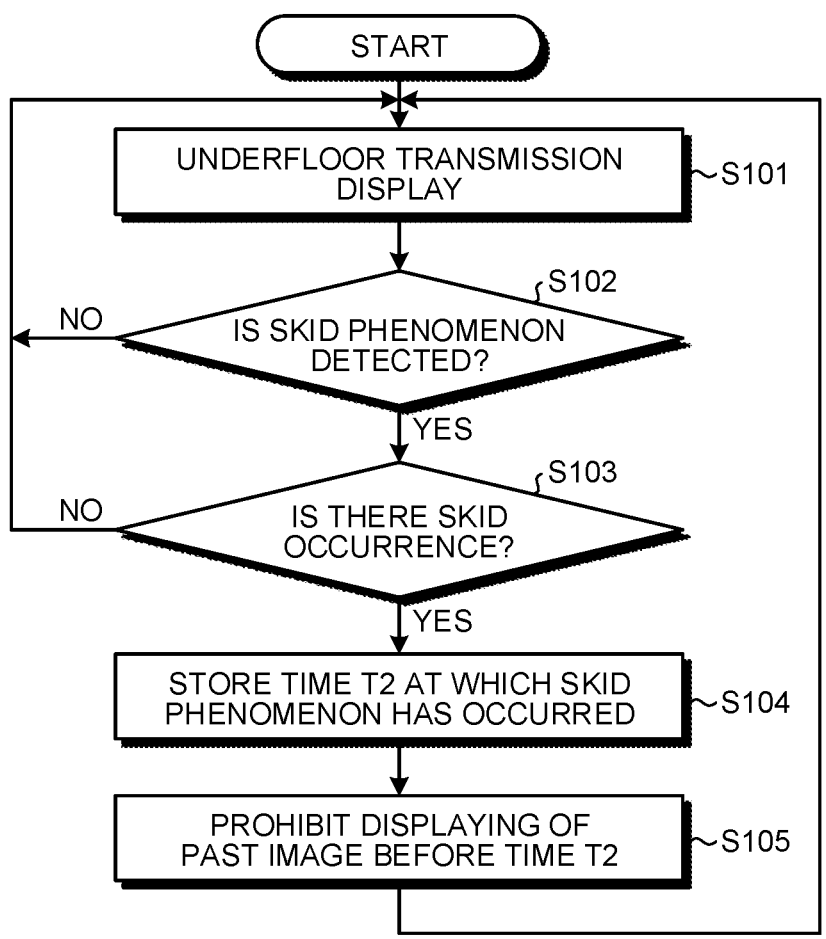
FIG. 13 is a flowchart illustrating an example of a procedure of display processing by the display ECU according to the embodiment.

Next, an example of display processing by the display ECU 10 according to the embodiment will be described with reference to FIG. 13. FIG. 13 is a flowchart illustrating an example of a procedure of display processing by the display ECU 10 according to the embodiment.

As illustrated in FIG. 13, for example, each unit of the display ECU 10 starts an underfloor transmission display in accordance with an instruction from an occupant through the HMI device 20 (step S101). The underfloor transmission display may be automatically started when a vehicle speed falls below a predetermined speed threshold value (for example, 20 km/h) regardless of the instruction from the occupant.

In step S101, the acquisition unit 101 acquires an image of the periphery of the vehicle 1 from the imaging device 6. The bird's-eye view image generation unit 102 combines the acquired images to generate a bird's-eye view image. The display image generation unit 104 initially generates a display image by combining the bird's-eye view image and a black image region. Thereafter, the past image generation unit 103 generates a past image from a bird's-eye view image generated previously, and generates a display image by appropriately combining the bird's-eye view image, the past image, and the black image region. The display control unit 106 causes the HMI device 20 to sequentially display the generated display images.

During the above processing, the estimation unit 105 estimates a movement direction and a movement amount of the vehicle 1 on the basis of detection results of the wheel speed sensor 4, the acceleration sensor 5, the steering angle sensor 8, and the like, and monitors occurrence of a skid phenomenon in the vehicle 1 (step S102). When no skid phenomenon is detected in the vehicle 1 (step S102: No), each unit of the display ECU 10 continues the underfloor transmission display (step S101).

When the skid phenomenon is detected in the vehicle 1 (step S102: Yes), the estimation unit 105 determines whether or not the skid phenomenon is a large skid phenomenon that can be said as a real skid (step S103).

In this case, for example, the estimation unit 105 may determine that the large skid phenomenon has occurred in a case where a drop amount DP of acceleration is equal to or greater than a predetermined threshold value on the basis of the drop amount DP of an observation value of the acceleration. Alternatively, for example, on the basis of a skid width L1 in the skid phenomenon, determination may be made such that the large skid phenomenon has occurred when the skid width L1 is equal to or greater than a predetermined threshold value. Alternatively, the estimation unit 105 may determine that the large skid phenomenon has occurred in a case where a skid period T1 is equal to or greater than a predetermined threshold value, for example, on the basis of the skid period T1 in the skid phenomenon.

Alternatively, the estimation unit 105 may refer to, for example, both the drop amount DP of the acceleration and the skid period T1, and determine that the large skid phenomenon has occurred when at least one of the drop amount DP of the acceleration and the skid period T1 is equal to or greater than a predetermined threshold value. Alternatively, for example, the estimation unit 105 may determine that the large skid phenomenon has occurred in a case where both the drop amount DP of the acceleration in the skid phenomenon and the skid period T1 are equal to or greater than a predetermined threshold value.

When it is determined that the detected skid amount is not the large skid phenomenon (step S103: No), each unit of the display ECU 10 continues the underfloor transmission display (step S101).

When it is determined that the detected skid amount is the large skid phenomenon (step S103: Yes), the estimation unit 105 stores a time T2 at which the skid phenomenon has occurred in the storage unit 108 (step S104). Thereafter, the display image generation unit 104 performs processing of hiding the past image captured at or before the time T2 to generate a display image (step S105). Each unit of the display ECU 10 continues the underfloor transmission display (step S101).

Note that the display ECU 10 continues the processing of steps S101 to S105 until any of the following conditions is satisfied. In a case where any one of the following conditions is satisfied, the display ECU 10 can perform processing of ending the underfloor transmission display from any of steps S101 to S105 described above.

The end condition of the underfloor transmission display by the display ECU 10 includes a case in which the power supply of the display ECU 10 is stopped, a case in which the power supply of the vehicle 1 is stopped by an ignition key or the like, a case in which the vehicle speed exceeds a predetermined speed such as 20 km/h, a case in which a display instruction of a navigation screen is given by an occupant or the like, and a case in which an end instruction of the underfloor transmission display is given by the occupant or the like.

In addition, the procedure of the end processing of the underfloor transmission display varies with which of the above conditions is applicable. As end processing when the vehicle speed exceeds the predetermined speed or when there is the display instruction of the navigation screen, the display ECU 10 ends the underfloor transmission display and displays the navigation screen. When an end condition other than the above end conditions is satisfied, the display ECU 10 turns off the display of the HMI device 20 as the end processing.

As the end condition other than the above end conditions, for example, a case in which a blinker operation by an occupant is performed may be added. In addition, as end processing other than the above end processing, for example, in a case where a blinker operation is performed, the underfloor transmission display may end to switch to a display capturing the side of the vehicle 1.

Comparative Example

For example, an object of the technique of JP 2016-53942 A described above is to solve a problem that, if there is an error in the outer peripheral length of a wheel, an error occurs in calculating the movement amount of the wheel, a shift occurs at a joint between a past image and a bird's-eye view image or a joint between the past images, and these images become discontinuous.

In order to solve the above problem, in the technique of JP 2016-53942 A, the vicinities of the joint of two images are compared with each other to calculate the shift amount of the joint, and an error in the outer peripheral length of the wheel is back-calculated from the calculated shift amount to correct the outer peripheral length. That is, the movement amount of the vehicle is specified (corrected) by specifying the shift amount of the image. An image matching technique is used to compare images near the joint.

In the image matching technique, the sum of absolute values of differences for each pixel is sequentially calculated while one of two images that should originally be continuous is moved by a minute amount with respect to the other image. As a result, the sum is minimized when the images included in the two images overlap each other, and thus, it is understood that the movement amount of the image at that time is the shift amount between the two images. When the fact that the sum is small is rephrased as that the matching rate of the image is high, it can be said that the above processing is processing of specifying the movement amount (peak position) of the image such that the matching rate of the image becomes the maximum value (peak value) on a graph in which the movement amount of the image is defined as the horizontal axis and the matching rate of the image is defined as the vertical axis. Such processing is called movement amount estimation by matching. If the shift of the image can be specified by the movement amount estimation, the movement amount of the vehicle can be specified.

The number of times of calculation required for the above processing is (the number of pixels to be compared)×(the number of times of movement of an image). At this time, there are an X direction and a Y direction in which an image is shifted, and the image needs to be moved in both the X direction and the Y direction. Therefore, more specifically, the number of times of calculation of the sum is (the number of pixels to be compared)×(the number of times of movement of the image in the X direction)×(the number of times of movement of the image in the Y direction). Moreover, when the vehicle body is rotating, the number of times of calculation is doubled by the rotation angle. As described above, since the image matching processing has a large target data amount (the number of pixels), the amount of calculation is enormous.

In addition, there are other problems in the image shift correction using the image matching technique. For example, when the vehicle 1 is moving on snow or in muddy ground, an image of an object collatable by image matching may not be shown in a joint portion, and in this case, it is difficult to correctly specify the movement amount by image matching. This is because, in a case where matching processing of two images that should be continuous is performed, if an object or the like having contrast is not shown in the joint portion of these images, even if the movement amount is changed, a clear change does not appear in the matching rate of the images (that is, the sum of differences for each pixel).

If the shift of the image cannot be specified by the movement amount estimation, the movement amount of the vehicle cannot be specified. When the range of the joint portion to be collated by the image matching is widened, the probability that an object having a contrast is shown in the range increases, but the amount of calculation increases in proportion to the number of pixels to be collated, which is also not easy.

Moreover, the contrast appearing in the image may change due to a shadow of a vehicle body casted on the road surface, reflection of light rays, or the like. Therefore, the position of the peak appearing in the graph of the matching rate of the image with respect to the movement amount of the image does not necessarily indicate the correct movement amount. Even in a case where the image of the object appearing in the image is an image of an object whose position appearing in the image changes from time to time, such as an animal, a floating object floating in a puddle, or the sun appearing on the water surface, or in a case where the image is a three-dimensional object having a height from a road surface, the position of the image changes due to a factor other than the movement of the vehicle, and as such, it is difficult to correctly specify the movement amount of the vehicle.

Moreover, in a case where a vehicle moves in a place where the road surface is covered with a pattern having regularity, such as a tiled road surface, a plurality of local peaks in which a matching rate of an image locally takes a maximum value appears on a graph in which a movement amount of the vehicle is defined as a horizontal axis and a matching rate of the image is defined as a vertical axis. Therefore, it is difficult to specify the movement amount of the vehicle.

In this way, for example, when the movement amount of the vehicle is specified using the image matching technique and the shift of the image is corrected on the basis of the movement amount of the vehicle, there is a problem that an image processing device with a huge amount of calculation and a high cost is required and correct correction cannot be performed in some cases.

In the display ECU 10 of the embodiment, when the estimation unit 105 detects that the skid phenomenon of the vehicle 1 has occurred, the display image generation unit 104 performs processing of hiding the past image having the capturing time before the occurrence time of the skid phenomenon among the plurality of past images. As a result, since the past image in which the display position is shifted due to the skid phenomenon is not displayed, it is possible to suppress erroneous recognition by the occupant, and it is possible to omit the matching processing of specifying the shift amount, so that it is possible to suppress costs.

In the display ECU 10 of the embodiment, even when the skid phenomenon is detected, the display image is generated in combination with the bird's-eye view image without performing the processing of hiding the past image having the capturing time after the occurrence time of the skid phenomenon. As a result, even in a region that has not been temporarily displayed, the region is supplemented by the subsequent past image, so that the occupant can eventually grasp the latest situation under the floor of the vehicle 1.

In the display ECU 10 of the embodiment, the skid phenomenon is detected on the basis of at least one of the rotation amount and the acceleration of the wheel 3 detected by the vehicle 1. As described above, since an expensive technique such as image matching is not used for detecting the skid phenomenon, the inexpensive display ECU 10 can be constructed.

In the display ECU 10 of the embodiment, when the skid width L1 of the detected skid phenomenon is less than the predetermined threshold value, the display image is generated without performing the processing even for the past image having the capturing time before the occurrence time of the skid phenomenon, and when the skid width L1 is equal to or greater than the predetermined threshold value, the display image is generated by performing the processing of hiding the past image.

If a predetermined past image is not displayed in a case where a slight skid phenomenon in which the skid width L1 is less than the predetermined threshold value occurs, the amount of information presented to the occupant decreases, and on the contrary, it may be difficult to grasp the situation of the vehicle 1. Therefore, as described above, when the skid width L1 is less than the predetermined threshold value, the display of the past image is continued without performing the hiding processing, whereby the occupant can easily grasp the current state of the vehicle 1 while suppressing the erroneous recognition by the occupant.

First Modification

Next, a display ECU according to a first modification of the embodiment will be described with reference to FIGS. 14A and 14B. The display ECU of the first modification is different from the display ECU 10 of the above-described embodiment in that, when the skid phenomenon occurs, a display image is generated by adding an indication indicating occurrence of a skid phenomenon.

Figure 14A:
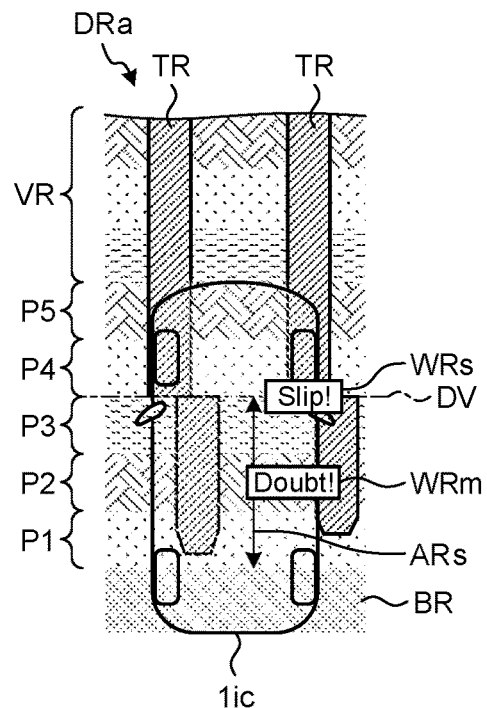
FIG. 14A is a schematic diagram illustrating an underfloor transmission display function included in a display ECU according to a first modification of the embodiment.
Figure 14B:
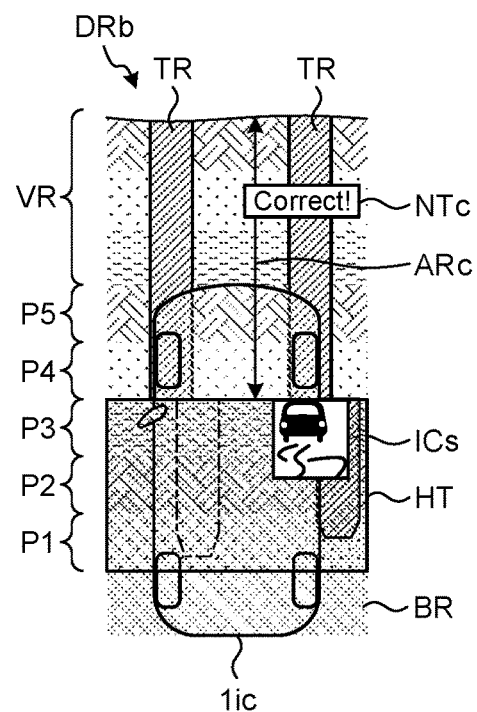
FIG. 14B is a schematic diagram illustrating the underfloor transmission display function included in the display ECU according to the first modification of the embodiment.

FIGS. 14A and 14B are schematic diagrams illustrating an underfloor transmission display function of the display ECU according to the first modification of the embodiment.

As illustrated in FIGS. 14A and 14B, in the display ECU of the first modification, when occurrence of a large skid phenomenon that can be said as a real skid is detected, the display image generation unit performs processing of adding an indication indicating occurrence of the skid phenomenon to a past image having a capturing time before the occurrence time of the skid phenomenon, for example, to generate a display image.

In FIGS. 14A and 14B, it is assumed that a large skid phenomenon that can be said as a real skid has occurred before the capturing time of the past image P3. That is, among the past images P1 to P5, the past images P1 to P3 have the capturing time before the occurrence time of the skid phenomenon, and the past images P4 and P5 have the capturing time after the occurrence time of the skid phenomenon.

In the example of FIG. 14A, as a display image DRa indicating that the skid phenomenon has occurred, for example, the display image generation unit of the first modification displays a boundary line DV at a joint between the images before and after the occurrence of the skid phenomenon, that is, a joint between the past images P3 and P4, and adds a warning WRs notifying the occurrence of the skid to the boundary line DV. Note that, in order to make the image near the boundary line DV easy to see, a leader line may be added to the boundary line DV to display the warning WRs at the end of the leader line, or the warning WRs may be displayed in a balloon indicating the boundary line DV.

In addition, a warning WRm indicating that the bird's-eye view image VR and the past images P4 and P5 are shifted may be displayed in the display range of the image before the skid phenomenon occurs, namely, the display range of the past images P1 to P3. In addition, the display range of the past images P1 to P3 may be indicated by an arrow ARs, and a range targeted for the warning WRm may be displayed.

In the example of FIG. 14B, as the indication indicating that the skid phenomenon has occurred, the display image generation unit of the first modification adds, for example, a hatching HT to the past images P1 to P3 having the capturing time before the occurrence of the skid phenomenon, and generates a display image DRb displaying a warning icon ICs notifying the occurrence of the skid on the past images P1 to P3.

In addition, a note NTc indicating that the reliability of display is high may be displayed in the display range of the image having the capturing time after the skid phenomenon occurs, that is, the display range of the bird's-eye view image VR and the past images P4 and P5. In addition, a range including the past images P4 and P5 may be displayed by an arrow ARc, and a range that is a target of the note NTc indicating that the reliability of display is high may be displayed.

As described above, the processing of the first modification in which the boundary line DV, the warnings WRs and WRm, the arrow ARs, the hatching HT, the warning icon ICs, and the like are displayed on the past images P1 to P3 is an example of the processing that is performed on the past images P1 to P3 and indicates that the skid phenomenon has occurred.

As described above, in the first modification, even when a large skid phenomenon occurs, the indication indicating that the display content is suspicious or the display specifying the range with high reliability is added, and then the display of the past images P1 to P3 is continued, thereby making it possible for the driver to estimate the situation of the vehicle with reference to the past image while preventing erroneous recognition of the past image whose display position is shifted.

Instead of the processing of adding the hatching HT to the past images P1 to P3, processing of reducing the luminance of the past images P1 to P3 to be lower than the luminance of the bird's-eye view image VR and the past images P4 and P5 may be performed.

In addition, the processing of displaying the boundary line DV, the warnings WRs and WRm, the arrows ARs and ARc, the hatching HT, the warning icon ICs, the note NTc, and the like illustrated in the first modification may be used in combination with the processing of the above-described embodiment in which the past image before occurrence of the skid phenomenon is not displayed.

In this case, for example, two threshold values are provided, the estimation unit may estimate the skid period T1, the skid speed V1, or the skid width L1 in the skid phenomenon, and the display image generation unit may add an indication indicating that the skid phenomenon has occurred to one or more past images as processing indicating that the skid phenomenon has occurred in a case where the skid period T1, the skid speed V1, or the skid width L1 is equal to or greater than a first threshold value and less than a second threshold value greater than the first threshold value, and may not display the one or more past images as processing indicating that the skid phenomenon has occurred in a case where the skid period T1, the skid speed V1, or the skid width L1 is equal to or greater than the second threshold value.

In addition to the various displays described in the first modification, when the state of the vehicle falls under a condition in which a skid phenomenon is likely to occur or a condition in which occurrence of a skid phenomenon is suspected even if a skid phenomenon is not detected, an indication indicating a possibility that at least part of the past image is shifted may be added to the display image. As described above, such a state of the vehicle includes, for example, a case in which sudden braking or large lateral G is applied to the vehicle, a case in which the product of the vehicle speed and the steering angle exceeds a certain value, and the like.

In this case, the indication indicating the possibility of the shift of the past image may be emphasized as the detection values of the sudden braking, the lateral G, the vehicle speed, and the steering angle are larger. In order to emphasize these displays, processing such as blinking the display, increasing the luminance of the display, or changing the color of the display to an emphasized color can be considered.

In the display ECU of the first modification, when the estimation unit detects occurrence of the skid phenomenon of the vehicle, the display image generation unit performs processing of adding displays such as the boundary line DV, the warning WRs, the arrow ARs, the hatching HT, and the warning icon ICs to the past image having the capturing time before the occurrence time of the skid phenomenon among the plurality of past images.

As a result, since the display of the shifted past image is continued while notifying the occupant that at least part of the past images is shifted, more information on a situation of the vehicle can be presented to the occupant. Therefore, the occupant can estimate the situation under the floor of the vehicle in more detail while being conscious of the possibility of erroneous recognition. Moreover, for example, in a case where the occupant is a driver himself or herself, it is possible to more appropriately drive the vehicle.

In the display ECU of the first modification, when the skid width L1 of the detected skid phenomenon is less than a predetermined threshold value, the display image is generated without performing the processing even for the past image having the capturing time before the occurrence time of the skid phenomenon, and when the skid width L1 is equal to or greater than the predetermined threshold value, the processing of adding the displays such as the boundary line DV, the warning WRs, the arrow ARs, the hatching HT, and the warning icon ICs to the past image is performed. The predetermined threshold value is set on the condition that the skid width is reliable enough not to change the determination related to driving. For example, the threshold value may be set to half the width of the tire with respect to sideslip, for example, 10 cm. As the predetermined threshold value, different values may be set for the longitudinal skid and the sideslip, and for example, the threshold value for the longitudinal skid may be 20 cm.

For example, even in a case where a slight skid phenomenon occurs, if an indication indicating that the skid phenomenon has occurred is performed on a predetermined past image, there is a possibility that the occupant is rather confused, and if the occupant feels that the warning is significantly sensitive and excessive, even if the warning is displayed, the warning may not be appropriately reflected in driving. Therefore, as described above, when the skid width L1 is less than the predetermined threshold value, the indication indicating that the skid phenomenon has occurred is not provided on the past image, so that the occupant can easily grasp the current state of the vehicle while suppressing the erroneous recognition by the occupant.

In the display ECU of the first modification, in a case where the skid width L1 of the detected skid phenomenon is less than the first threshold value, the display image is generated without performing processing even for the past image having the capturing time before the occurrence time of the skid phenomenon. In a case where the skid width L1 is equal to or greater than the first predetermined threshold value and less than the second threshold value greater than the first threshold value, the processing of adding displays such as the boundary line DV, the warning WRs, the arrow ARs, the hatching HT, and the warning icon ICs to the past image is performed. In a case where the skid width L1 is equal to or greater than the second predetermined threshold value, processing of hiding the past image is performed.

In this manner, by providing a plurality of threshold values for the skid width L1 and appropriately differentiating the processing in the display image, more appropriate information can be presented to the occupant.

With the display ECU of the first modification, other effects similar to those of the above-described embodiment are obtained.

Second Modification

Next, a display ECU according to a second modification of the embodiment will be described with reference to FIGS. 15A and 15B. The display ECU of the second modification is different from the display ECU 10 of the above-described embodiment in that, when a skid phenomenon occurs, a display image is generated by adding an indication that indicates the occurrence of the skid phenomenon and is different from that of the above-described first modification.

Figure 15A:
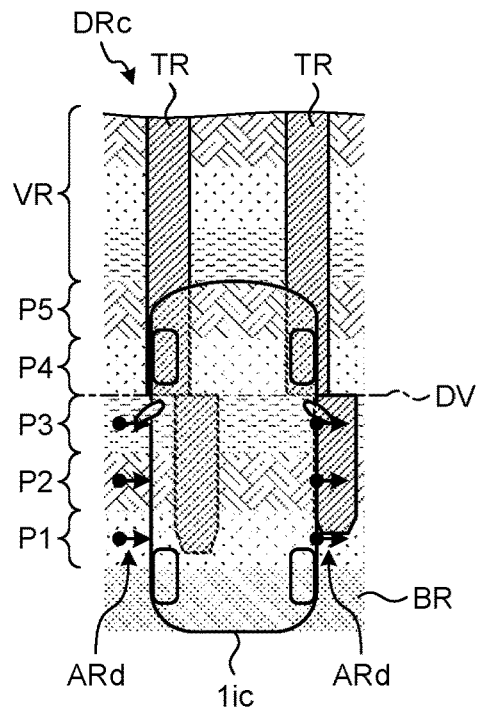
FIG. 15A is a schematic diagram illustrating an underfloor transmission display function included in a display ECU according to a second modification of the embodiment.
Figure 15B:
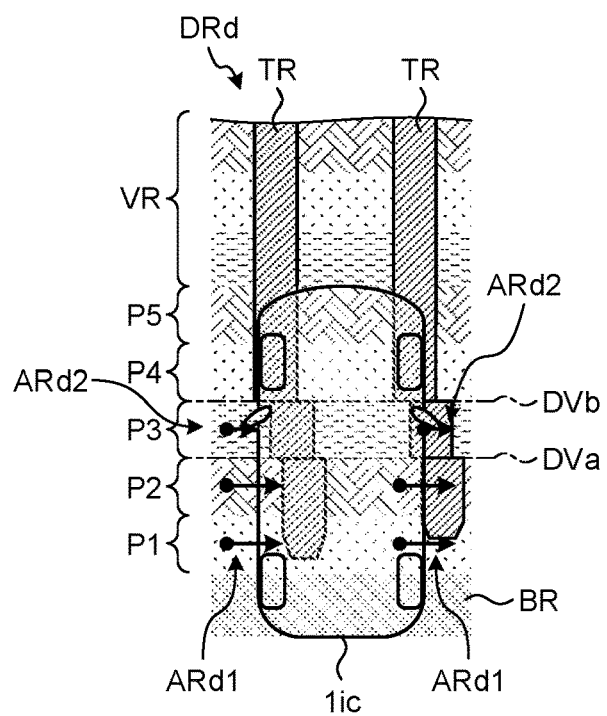
FIG. 15B is a schematic diagram illustrating the underfloor transmission display function included in the display ECU according to the second modification of the embodiment.

FIGS. 15A and 15B are schematic diagrams illustrating an underfloor transmission display function included in the display ECU according to the second modification of the embodiment.

In FIG. 15A, similarly to FIGS. 14A and 14B described above, it is assumed that a large skid phenomenon that can be said as a real skid has occurred before the capturing time of the past image P3. The estimation unit may estimate a skid direction in the skid phenomenon, and the display image generation unit may add an indication indicating the skid direction to one or more past images as processing indicating that the skid phenomenon has occurred.

In the example of FIG. 15A, the display image generation unit of the second modification generates, for example, a display image DRc that displays an arrow ARd indicating a direction in which the past images P1 to P3 are shifted due to the skid phenomenon as an indication indicating the skid direction on the past images P1 to P3 having the capturing time before the occurrence of the skid phenomenon as the indication indicating that the skid phenomenon has occurred. The direction in which the past images P1 to P3 are shifted can be estimated from the acceleration detected by the acceleration sensor.

For example, in the example of FIG. 15A, the wheel skids rightwards and falls into a rut, the acceleration sensor detects the acceleration in the right direction when the wheel skids rightwards, and detects the acceleration in the left direction when the wheel falls into a rut and the movement in the lateral direction stops. Therefore, determination can be made such that the vehicle body has skidded rightwards from the temporal change of the acceleration.

The arrow ARd may be displayed for each of the plurality of past images P1 to P3, or the plurality of arrows ARd may be displayed side by side at equal intervals in the display range of the past images P1 to P3. In addition, as in the example of FIG. 15A, the direction in which the vehicle body is shifted may be illustrated, or the direction in which the shifted past image is to be returned may be illustrated on the assumption that the position of the past image shifted in the brain of the occupant or on the display image is returned to the correct position. Processing of returning the shifted position of the past image on the display image will be described later.

At this time, the length of the arrow ARd may be changed according to the shift amount of the past images P1 to P3. That is, for example, the arrow ARd can be made longer as the shift amount is larger. The shift amount of the past images P1 to P3 can be estimated from the magnitude of the acceleration indicating the occurrence of the skid phenomenon. Note that the length of the arrow ARd may be constant without depending on the shift amount, or may be changed in accordance with the shift amount or may not be proportional to the shift amount. Since it is difficult to display an arrow indicating a large shift amount exceeding half of the vehicle width without changing the layout, for example, the length of the arrow ARd may be divided into two long and short stages, and a long arrow may be displayed when the shift amount exceeds a predetermined value.

Moreover, in the example of FIG. 15A, similarly to FIG. 14A described above, for example, the boundary line DV may be displayed at the joint between the past images P3 and P4 before and after the skid phenomenon occurs.

In addition, when the skid phenomenon occurs a plurality of times, the arrow ARd may be displayed corresponding to the occurrence time of each skid phenomenon. FIG. 15B illustrates an example in which the skid phenomenon occurs a plurality of times. In FIG. 15B, it is assumed that a large skid phenomenon that can be said as a real skid has occurred once before the capturing time of the past image P2 and once more before the capturing time of the past image P3.

As illustrated in FIG. 15B, when the skid phenomenon occurs a plurality of times, the display image generation unit of the second modification adds an indication indicating each skid phenomenon and generates a display image DRd. That is, the display image generation unit of the second modification adds arrows ARd1 and ARd2 to the display ranges of the past images P1 and P2 before the occurrence time of the first skid phenomenon and the display range of the past image P3 after the occurrence of the first skid phenomenon and before the occurrence time of the second skid phenomenon, respectively.

The display image generation unit may add an indication indicating the number of times of occurrence of the skid phenomenon to one or more past images as processing indicating the occurrence of the skid phenomenon. For example, the lengths of the arrows ARd1 and ARd2 may be changed for each of a plurality of skid phenomena. That is, for example, as the number of times of occurrence of the skid phenomenon increases, the length of the corresponding arrow can be increased.

In the example of FIG. 15B, the arrow ARd1 added to the region P1 and the region P2 indicates that the vehicle skids twice in the first and second skid phenomena. Therefore, the arrow ARd1 is displayed longer than the arrow ARd2 added to the region P3 where the vehicle skids only once in the second skid phenomenon. In addition, in order to indicate that the user has skidded twice, the length of the arrow may be made twice the length of one arrow, the arrow may be indicated by a double line, or "×2" may be added to the arrow to indicate the number of skid phenomena.

Moreover, boundary lines DVa and DVb may be displayed at positions corresponding to the respective skid phenomena, that is, at the joint of the past images P2 and P3 before and after the occurrence of the first skid phenomenon and at the joint of the past images P3 and P4 before and after the occurrence of the second skid phenomenon, respectively.

By adding the arrows ARd1 and ARd2, the boundary lines DVa and DVb, and the like for each of the plurality of skid phenomena, it is possible to leave the history of the skid phenomena that have occurred so far in the display image DRd, and it is possible to represent the number of times of occurrence of the skid phenomena so far. In addition, "first time" may be added to the boundary line DVa, and "second time" may be added to the DVb.

As described above, the processing of the second modification in which the boundary lines DV, DVa, and DVb, the arrows ARd, ARd1, and ARd2, and the like are displayed with respect to the past images P1 to P3 is an example of the processing that is performed with respect to the past images P1 to P3 and indicates that the skid phenomenon has occurred. Even in the second modification, even when a large skid phenomenon occurs as described above, the display of the past images P1 to P3 is continued after the display capable of maintaining the visibility is added.

Note that the display image generation unit may cancel or change at least part of the processing performed on one or more past images in a case where the speed of the vehicle is less than a predetermined value or in a case where an operation is performed by an occupant of the vehicle.

In this case, for example, while the vehicle is traveling at 1 km/h or more, the hiding processing of the embodiment may be performed, and when the speed of the vehicle is reduced to less than 1 km/h or the vehicle completely stops, the hiding processing of the embodiment may be canceled, or the hiding processing of the embodiment may be changed to the processing shown in the second modification, and the past image that has been hidden may be displayed after the arrows ARd, ARd1, and ARd2, and the like are added. In addition, even in a case where an operation is performed by an occupant of the vehicle, the above-described processing may be canceled or the processing may be changed.

At this time, in a case where an operation is performed by an occupant of the vehicle when the speed of the vehicle is less than a predetermined value, the display image generation unit may not cancel the cancellation or change of the processing even if the speed of the vehicle exceeds the predetermined value. For example, while the vehicle is traveling at 1 km/h or more, the display of the past image is prohibited, and when the speed of the vehicle decreases to less than 1 km/h, the processing is changed to the processing of adding an indication indicating that a skid phenomenon has occurred. At the same time, a button for receiving a confirmation operation by an occupant is displayed. After the occupant presses the button to perform the confirmation operation, the display of the past image may be continued even when the vehicle speed becomes 1 km/h or more again. Since it is considered that the shift of the past image is recognized at the time point when the occupant checks the past image, there is a low possibility that anew erroneous recognition occurs even if the past image is continuously displayed, and it can be expected that the merit of displaying the past image exceeds the demerit due to the misunderstanding.

Moreover, in the processing performed when the speed of the vehicle is reduced to less than 1 km/h or the vehicle completely stops, the processing of the first modification may be performed instead of the processing of the second modification.

In this way, for example, by displaying the past image that has not been displayed at the timing when the vehicle stops, it is possible to urge the occupant to confirm the situation of the shift of the past image and the like.

However, when the occupant is a driver himself or herself, it is not preferable to perform such an operation while the vehicle is traveling. Therefore, as described above, it is preferable that the operation can be accepted on the condition that the speed of the vehicle is less than the predetermined value. It is noted that if the HMI device 20 is installed in the passenger seat side and is operated by a navigator different from the driver, the operation may always be accepted, and it may be set to prohibit the control of hiding the past image before the skid phenomenon according to the vehicle speed (that is, set to add processing indicating that the skid phenomenon has occurred and to always perform the display).

In addition, similarly to the example described in the first modification described above, two or more threshold values are provided in at least one of the skid period T1 and the skid width L1, and the processing to be performed on the past image can be switched between the processing of the embodiment and the processing of the second modification according to a magnitude relationship between these threshold values and the skid period T1, the skid width L1, and the like.

Even in such a case, when a large skid phenomenon is detected and the past image is hidden, after the speed of the vehicle is reduced to less than 1 km/h or the vehicle completely stops, the hiding processing of the past image may be canceled, and the display image may be switched to a display image in which the display of the boundary line DV, the warnings WRs and WRm, the arrows ARs and ARc, the hatching HT, the warning icon ICs, the note NTc, and the like of the first modification, or the display of the arrows ARd, ARd1, and ARd2, and the like of the second modification are added to these past images.

However, in a case where a moderate skid phenomenon is detected and the display of the first modification or the second modification is performed on the past image, the visibility of the past image is maintained even while these displays are performed. Therefore, for example, the past image before the skid phenomenon may be displayed regardless of the speed of the vehicle, and the display may not be switched.

Moreover, when the processing of the embodiment and the processing of the first and second modifications are used together, the occupant may be able to select the display by the processing of the embodiment, the display by the processing of the first modification, and the display by the processing of the second modification. In this case, the occupant may be able to select a desired display method in advance from the displays of the embodiment and the first and second modifications. Alternatively, the occupant may be able to switch between the display of the embodiment and the display of the first and second modifications when the vehicle stops. Since it is dangerous if the driver operates the HMI device while the vehicle is traveling, when the passenger seat is vacant, the switching operation may be received only when the vehicle stops.

In the display ECU of the second modification, the skid direction in the skid phenomenon is estimated, and the processing of adding the arrows ARd, ARd1, and ARd2, and the like indicating the skid direction to one or more past images is performed. As described above, since the occupant can also recognize the shift direction of the past image, the occupant can recognize the situation of the vehicle in more detail while suppressing erroneous recognition by the occupant. In addition, in the display image to which the display of the second modification is added, since the visibility of the shifted past image is maintained, even when a large skid phenomenon occurs, more information can be presented to the occupant.

In the display ECU of the second modification, when the operation is performed by the occupant of the vehicle after the vehicle stops, at least part of the processing performed on the past image while the vehicle is traveling is canceled, such as permitting the display of one or more past images while adding the indication indicating that the skid phenomenon has occurred. As a result, the shifted past image is displayed while notifying the occupant that at least part of the past images is shifted, so that more information about the situation of the vehicle can be presented to the occupant.

In the display ECU of the second modification, processing of adding the arrows ARd1 and ARd2 indicating the number of times of occurrence of the skid phenomenon, the boundary lines DVa and DVb, and the like to one or more past images is performed. As a result, the occupant can follow the history of the skid phenomenon that has occurred so far, and the occupant can recognize the situation of the vehicle in more detail while suppressing erroneous recognition by the occupant.

In the display ECU of the second modification, in a case where the skid width L1 of the detected skid phenomenon is less than the predetermined threshold value, the display image is generated without performing the processing even for the past image having the capturing time before the occurrence time of the skid phenomenon, and in a case where the skid width L1 is equal to or greater than the predetermined threshold value, the processing of adding the display such as the arrows ARd, ARd1, and ARd2 indicating the skid direction to the past image is performed.

As described above, in a case where a slight skid phenomenon has occurred, if an indication indicating that the skid phenomenon has occurred is performed on a predetermined past image, there is a possibility that the occupant may be confused, or the detection may be too sensitive and the warning may be perceived as excessive. Therefore, when the skid width L1 is less than the predetermined threshold value, the indication indicating that the skid phenomenon has occurred is not provided in the past image, whereby the occupant can easily grasp the current state of the vehicle while suppressing the erroneous recognition by the occupant.

In the display ECU of the second modification, in a case where the skid width L1 of the detected skid phenomenon is less than the first threshold value, the display image is generated without performing the processing even for the past image having the capturing time before the occurrence time of the skid phenomenon. In a case where the skid width L1 is equal to or greater than the first predetermined threshold value and less than the second threshold value greater than the first threshold value, the processing of adding the display of the arrows ARd, ARd1, and ARd2 indicating the skid direction to the past image is performed. In a case where the skid width L1 is equal to or greater than the second predetermined threshold value, the processing of hiding the past image is performed.

In this manner, by providing a plurality of threshold values for the skid width L1 and appropriately differentiating the processing in the display image, more appropriate information can be presented to the occupant.

With the display ECU of the second modification, the same effects as those of the above-described embodiment are obtained.

Third Modification

Next, a display ECU according to a third modification of the embodiment will be described with reference to FIGS. 16A and 16B. The display ECU of the third modification is different from the display ECU 10 of the above-described embodiment in that a display image is generated by adding an indication indicating that a continuous or intermittent skid phenomenon has occurred.

When the skid phenomenon occurs continuously or intermittently in the vehicle 1, it may be difficult to specify the occurrence time of the skid phenomenon, the skid period T1, the skid width L1, and the like.

As described above, such a continuous or intermittent skid phenomenon may occur when, for example, a vehicle is traveling on an unpaved muddy road surface, a gravel-laid road surface, a road surface covered with snow in a pressed snow state, or the like. Even in such a case, the occurrence of the skid phenomenon itself can be detected by the mismatch of the rotation amount between the plurality of wheels, the mismatch between the rotation amount of the wheel and the acceleration detected by the vehicle body, and the like.

In the above case, an estimation unit of the display ECU of the third modification acquires the wheel speed of the drive wheel and the wheel speed of the driven wheel from a wheel speed sensor of each wheel to calculate a skid rate. The skid rate is calculated by the following Equation (3), and is an index that defines the magnitude of the skid phenomena similarly to the skid period T1 and the skid width L1 described above.

$$\text{Skid rate (\%)} = (\text{wheel speed of drive wheel} \div \text{wheel speed of driven wheel} - 1) \times 100 \qquad (3)$$

As shown in Equation (3), by defining a difference in wheel speed between the drive wheel and the driven wheel as the skid rate, the magnitude of the skid phenomenon that occurs continuously or intermittently can be quantitatively estimated. For example, when the vehicle is traveling on a paved road surface in a state where the wheel always maintains its grip on the road surface, the skid rate is, for example, less than 1%. On the other hand, when the drive wheel is scraping gravel or mud, this state is a state in which a skid phenomenon occurs continuously or intermittently. Therefore, the skid rate reaches, for example, several %.

Figure 16A:
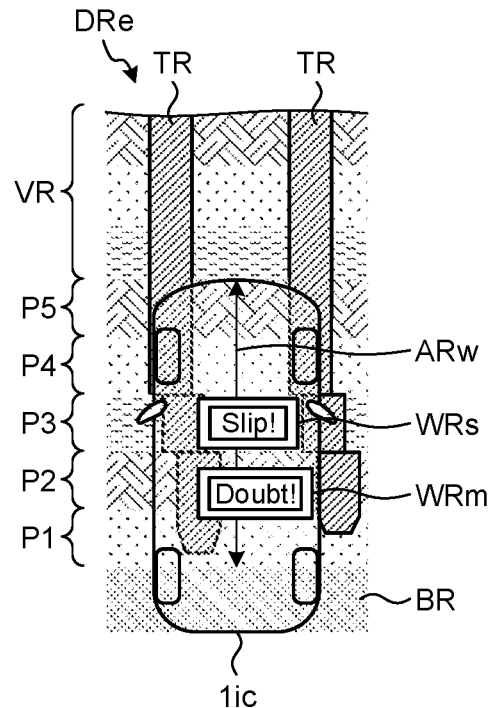
FIG. 16A is a schematic diagram illustrating an underfloor transmission display function included in a display ECU according to a third modification of the embodiment.
Figure 16B:
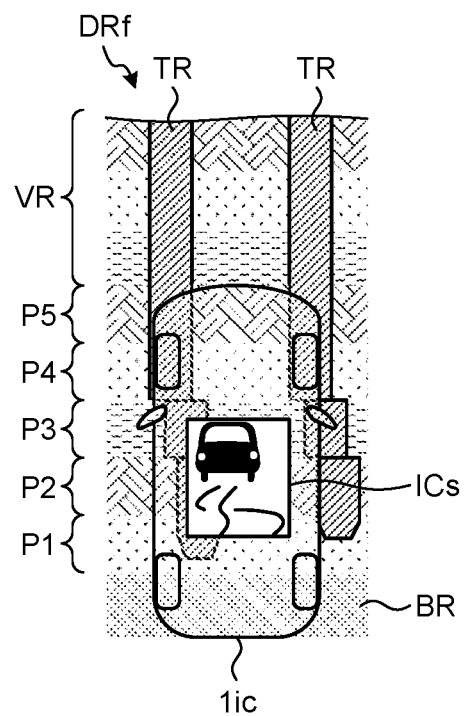
FIG. 16B is a schematic diagram illustrating the underfloor transmission display function included in the display ECU according to the third modification of the embodiment.

FIGS. 16A and 16B are schematic diagrams illustrating an underfloor transmission display function included in the display ECU according to the third modification of the embodiment.

In FIGS. 16A and 16B, it is assumed that a skid phenomenon occurs continuously or intermittently in the vehicle 1, and a clear skid period T1 does not appear in the detection result of the acceleration sensor. When the estimation unit detects a continuous or intermittent skid phenomenon, the display image generation unit may perform processing of indicating that the skid phenomenon has occurred in all the past images displayed in combination with the bird's-eye view image.

As illustrated in FIGS. 16A and 16B, in the display ECU of the third modification, when a continuous or intermittent skid phenomenon in which it is difficult to specify the skid period T1 is detected, the display image generation unit generates a display image by performing processing indicating that the skid phenomenon has occurred to all the past images to be displayed in combination with the bird's-eye view image among the plurality of past images. In the examples of FIGS. 16A and 16B, among the plurality of past images generated so far, past images P1 to P5 are combined with the bird's-eye view image VR and the display image is displayed.

In the example of FIG. 16A, the display image generation unit of the third modification generates, as an indication indicating that the skid phenomenon has occurred, a display image DRe in which, for example, the entire display range of the past images P1 to P5 is displayed as an arrow ARw, and a warning WRs notifying the occurrence of the skid is displayed on the arrow ARw. In addition, a warning WRm indicating that the display of the past images P1 to P3 is shifted may be displayed on the arrow ARw.

In the example of FIG. 16B, the display image generation unit of the third modification generates, as an indication indicating that the skid phenomenon has occurred, for example, a display image DRf in which a warning icon ICs notifying the occurrence of the skid is displayed in the display range of the past images P1 to P5.

As described above, the processing of the third modification in which the warning WRs, WRm, the arrow ARs, the warning icon ICs, and the like are displayed for all the past images P1 to P5 is an example of the processing indicating that the skid phenomenon has occurred, which is performed for the past images P1 to P5. In the third modification, for example, even when the skid phenomenon in which it is difficult to specify the skid period T1 occurs, the past images P1 to P5 are subjected to the processing indicating that the skid phenomenon has occurred without specifying the shifted past image.

Note that the degree of emphasis of the display of the warnings WRs and WRm, the arrow ARs, the warning icon ICs, and the like illustrated in the third modification may be changed according to the magnitude (for example, the skid rate) of the detected skid phenomenon.

In order to emphasize the display, processing such as blinking the display, increasing the luminance of the display, or changing the color of the display to an emphasized color can be considered. The magnitude of the skid phenomenon can be determined from, for example, a skid rate or a steering angle of the vehicle at the time of detecting the skid phenomenon. That is, for example, as the skid rate or the steering angle of the vehicle increases, the degree of emphasis of the display can be increased.

In the display ECU of the third modification, when the estimation unit detects the skid phenomenon continuously or intermittently, the processing indicating that the skid phenomenon has occurred is performed on all the past images displayed in combination with the bird's-eye view image among the plurality of past images. As a result, for example, even in a case where it is difficult to specify the skid period T1, it is possible to present to the occupant that there is a past image that has been shifted.

With the display ECU of the third modification, the same effects as those of the above-described embodiment are obtained.

Fourth Modification

Next, a display ECU according to a fourth modification of the embodiment will be described with reference to FIGS. 17A and 17B. The display ECU of the fourth modification is different from the display ECU 10 of the above-described embodiment in that the occupant can correct the past image that has been shifted.

Figure 17A:
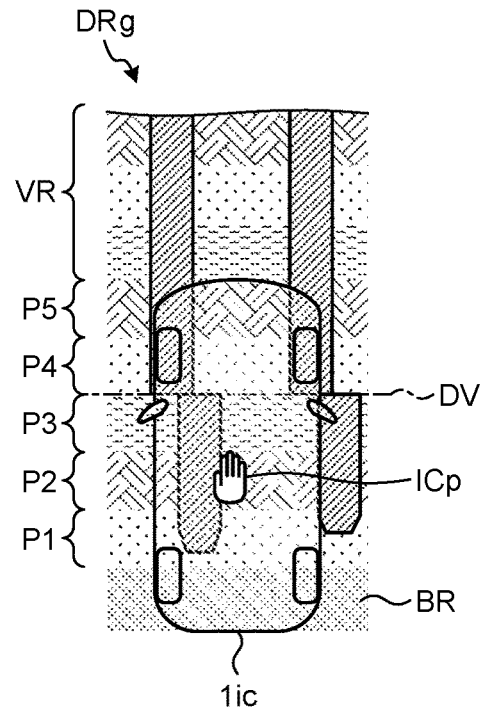
FIG. 17A is a schematic diagram illustrating an underfloor transmission display function included in a display ECU according to a fourth modification of the embodiment.
Figure 17B:
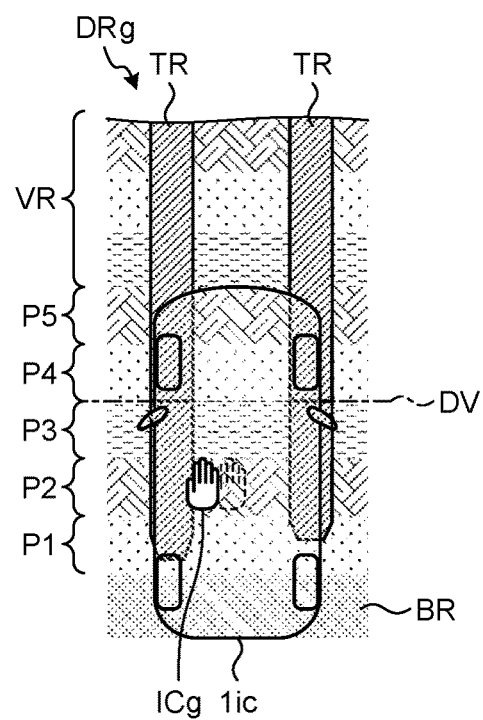
FIG. 17B is a schematic diagram illustrating the underfloor transmission display function included in the display ECU according to the fourth modification of the embodiment.

FIGS. 17A and 17B are schematic diagrams illustrating an underfloor transmission display function included in the display ECU according to the fourth modification of the embodiment. FIGS. 17A and 17B illustrate part of a display image DRg obtained by performing processing indicating that the skid phenomenon has occurred on the past images P1 to P3.

As illustrated in FIG. 17A, the display image generation unit of the fourth modification generates the display image DRg in which a boundary line DV is displayed at a joint between the past images P1 to P3 shifted and the past images P4 and P5 not shifted. The display processing device may further include a detection unit configured to detect a touch operation on a display device, and the display image generation unit may perform processing of moving a display position of one or more past images in a display image according to the touch operation by an occupant in the vehicle.

For example, in the example of FIG. 17A, it is assumed that the display image DRg displayed on the HMI device of the vehicle is touched. The display ECU of the fourth modification has a configuration corresponding to the detection unit 107 configured to detect that the touch panel of the HMI device 20 is touched in the display ECU of the above-described embodiment.

The detection unit of the fourth modification detects the touch operation by the occupant or the like, and the display image generation unit of the fourth modification causes a finger icon ICp in the form of, for example, a finger to be displayed at a position where the touch operation is detected on the display image DRg.

As illustrated in FIG. 17B, when the occupant touches and drags the display range of the shifted past images P1 to P3 in the display image DRg, the display image generation unit of the fourth modification moves the finger icon ICg according to such a touch operation, and performs processing of moving the display positions of the past images P1 to P3 in the display image DRg by the same amount as the finger icon ICg.

Since the human's recognition ability is excellent, the human can distinguish between the animal and the road surface even in a case where it is difficult to correctly estimate the movement amount by image matching, for example, in a case where the moving animal is reflected in the image. Therefore, the human can correctly recognize the shift of the past images P1 to P3 in the display image DRg without being confused by the movement of the animal. Therefore, by moving the display positions of the past images P1 to P3 according to the touch operation of the occupant, the shift in the past images P1 to P3 is corrected.

The display image generation unit stores, as the latest display image, the display image DRg including the past images P1 to P3 having display positions when the occupant's finger moves away after the touch operation. Thereafter, for example, when the vehicle restarts traveling, the display image generation unit continues the underfloor transmission display processing on the basis of the stored latest display image DRg.

Note that the display image generation unit may be configured not to accept an operation by an occupant of a vehicle and a touch operation by an occupant of a vehicle when the speed of the vehicle is equal to or higher than a predetermined value when the operation by the occupant of the vehicle or the touch operation by the occupant of the vehicle is performed.

For example, the display ECU of the fourth modification does not receive the touch operation when the speed of the vehicle is, for example, 1 km/h or more, and does not display the finger icon ICg. This is because the restriction of the operation is the same as the restriction of the reception of the operation by the occupant described in the second modification, and in a case where the occupant is a driver himself or herself, it is not preferable to perform the touch operation while the vehicle is traveling.

In addition, the processing of the fourth modification may be used in combination with at least one of the hiding processing of the embodiment, the display processing of the boundary line DV, the warnings WRs and WRm, the arrow ARs, the hatching HT, the warning icon ICs, and the like of the first modification, and the processing of displaying the arrows ARd, ARd1, and ARd2, and the like of the second modification. The above-described processing of the fourth modification may be used in combination with the above-described various types of processing performed by appropriately combining the hiding processing of the embodiment and the display processing of the first and second modifications.

In the display ECU of the fourth modification, the processing of moving the display positions of the shifted past images P1 to P3 in the display image DRg according to the touch operation by the occupant is performed. As a result, the display positions of the past images P1 to P3 that have been shifted can be corrected. In addition, the display image DRg including the corrected past images P1 to P3 can be displayed, and the occupant can more easily grasp the current state of the vehicle while further suppressing erroneous recognition by the occupant.

With the display ECU of the fourth modification, the same effects as those of the above-described embodiment are obtained.

Fifth Modification

Figure 18:
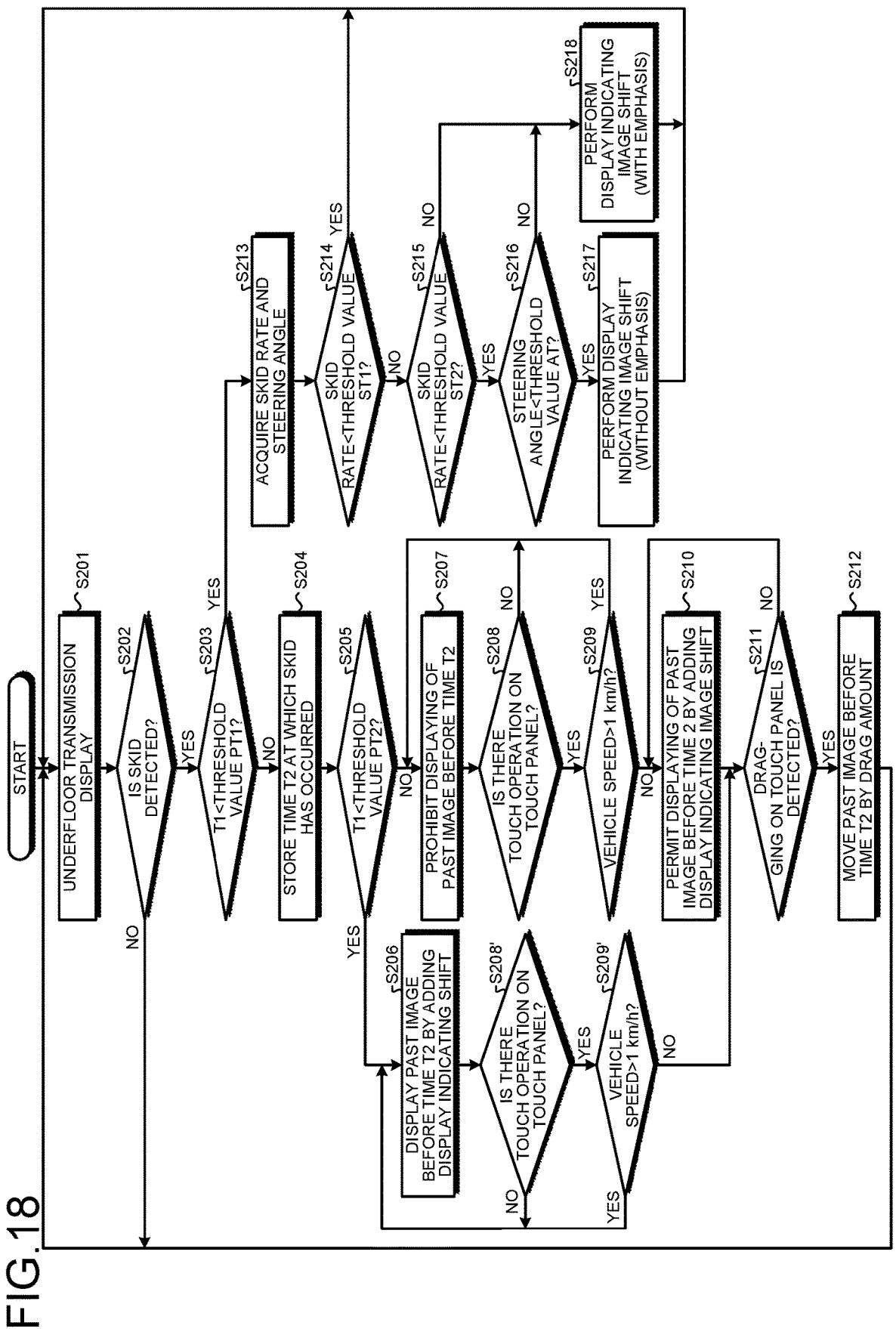
FIG. 18 is a flowchart illustrating an example of a procedure of display processing by a display ECU according to a fifth modification of the embodiment.

As described above, the hiding processing of the embodiment, the processing of displaying the boundary line DV, the warnings WRs and WRm, the arrow ARs, the hatching HT, the warning icon ICs, and the like of the first modification, the processing of displaying the arrows ARd, ARd1, and ARd2, and the like of the second modification, and the display position correction processing of the past image of the fourth modification can be appropriately combined and performed. FIG. 18 illustrates an example of a flow in a case where these types of processing are performed in combination.

FIG. 18 is a flowchart illustrating an example of a procedure of display processing by a display ECU according to a fifth modification of the embodiment.

As illustrated in FIG. 18, for example, in accordance with an instruction from an occupant via the HMI device, each unit of the display ECU of the fifth modification starts an underfloor transmission display (step S201).

Moreover, during the above processing, an estimation unit of the fifth modification estimates a movement direction and a movement amount of a vehicle on the basis of detection results of various sensors, and monitors occurrence of a skid phenomenon (step S202). When no skid phenomenon is detected (step S202: No), each unit of the display ECU continues the underfloor transmission display (step S201).

When the skid phenomenon is detected in the vehicle (step S202: Yes), the estimation unit determines whether the skid period T1 of the detected skid phenomenon is less than a threshold value PT1 set in advance for the skid period T1 (step S203).

When the skid period T1 is less than the threshold value PT1 or the skid period T1 is not detected (step S203: Yes), it is considered that a skid phenomenon occurs continuously or intermittently. The case where the skid period T1 is not detected is a case where the acceleration in the horizontal direction detected by the acceleration sensor does not become less than the predetermined threshold value in a situation where the acceleration in the horizontal direction should be detected by acceleration/deceleration or steering, and the case where the skid period T1 is less than the threshold value PT1 is a case where the duration of the state where the acceleration in the horizontal direction is less than the predetermined threshold value is less than the threshold value PT1. In this case, the display ECU advances the processing to step S213.

In a case where the skid period T1 is equal to or greater than the threshold value PT1 (step S203: No), it is considered that a large skid phenomenon that can be said as a real skid has occurred. The estimation unit stores a time T2 at which such a skid phenomenon has occurred in the storage unit (step S204).

The estimation unit determines whether or not the skid period T1 is less than a threshold value PT2 (step S205). The threshold value PT2 is a threshold value set in advance for the skid period T1, and a value greater than the threshold value PT1 is set. That is, the threshold value PT2 represents a period longer than the threshold value PT1.

In a case where the skid period T1 is less than the threshold value PT2 (step S205: Yes), it is considered that a relatively small skid phenomenon has occurred among the skid phenomena that can be said as a real skid. In this case, the display image generation unit of the fifth modification thereafter performs processing of adding, for example, the display of the first modification or the display of the second modification to the past image whose capturing time is before the time T2, thereby generating a display image (step S206).

On the other hand, in a case where the skid period T1 is equal to or greater than the threshold value PT2 (step S205: No), it is considered that a relatively large skid phenomenon has occurred among the skid phenomena that can be said as a real skid. In this case, the display image generation unit of the fifth modification thereafter performs processing of hiding the past image whose capturing time is before the time T2, thereby generating a display image (step S207).

A detection unit of the fifth modification detects whether or not a touch operation has been performed on the touch panel of the HMI device (step S208). If there is no touch operation (step S208: No), the display image generation unit continues to generate the display image that does not display the past image (step S207).

If the touch operation has been performed (step S208: Yes), the estimation unit determines whether or not the current speed of the vehicle exceeds, for example, 1 km/h on the basis of detection results from the various sensors (step S209). When the vehicle speed exceeds 1 km/h (step S209: Yes), the display image generation unit continues to generate the display image in which the past image is not displayed without accepting the touch operation (step S207).

When the vehicle speed is 1 km/h or less (step S209: No), the display image generation unit adds, for example, the display of the first modification or the display of the second modification, cancels the hiding processing of the past image before the time T2, and generates a display image (step S210).

Note that the processing of step S208 may not be performed. That is, when the estimation unit detects that the vehicle speed becomes 1 km/h or less, the display image generation unit may automatically cancel the hiding processing of the past image before the time T2.

The detection unit detects whether or not a touch operation of dragging a touched portion on the touch panel of the HMI device has been performed (step S211). When no drag is detected (step S211: No), the display image generation unit continues to generate the display image including the past image to which the display of the first modification or the second modification is added (step S210).

In a case where the drag has been detected (step S211: Yes), the display image generation unit moves the past image before the time T2 at which a shift has occurred by the detected drag amount, and stores the display image including the moved past image in the storage unit as the latest display image (step S212).

In the above description, even in a case where the display image including the past image to which the display of the first modification or the second modification is added is generated (step S206), a touch operation detection processing (step S208') and a vehicle speed determination processing (step S209') according to steps S208 and S209 described above are performed, and then the acceptance of the touch operation of dragging on the touch panel is permitted (steps S211 and S212). However, in this case, the display image generation unit does not perform, for example, switching from the display screen while the vehicle is traveling (step S210).

Each unit of the display ECU continues the underfloor transmission display even after the processing of step S212 (step S201).

On the other hand, in the processing of determining whether the skid period T1 is less than the threshold value PT1 (step S203), when the skid period T1 is at least less than the threshold value PT1 (step S203: Yes), the estimation unit obtains a skid rate from the above Equation (3) and acquires information on the steering angle of the vehicle detected by the steering angle sensor (step S213).

In addition, the estimation unit determines whether or not the skid rate obtained by Equation (3) is less than a threshold value ST1 set in advance for the skid rate (step S214). When the skid rate is less than the threshold value ST1 (step S214: Yes), each unit of the display ECU continues the underfloor transmission display (step S201). If the skid rate is equal to or greater than the threshold value ST1 (step S214: No), the estimation unit determines whether or not the skid rate is less than a threshold value ST2 (step S215). The threshold value ST2 is a threshold value set in advance for the skid rate, and a value greater than the threshold value ST1 is set.

If the skid rate is less than the threshold value ST2 (step S215: Yes), the estimation unit determines whether or not the steering angle acquired from the steering angle sensor is less than a threshold value AT set in advance for the steering angle (step S216). When the steering angle is less than the threshold value AT (step S216: Yes), the display image generation unit thereafter performs processing of adding, for example, the display of the third modification to all the past images included in the display image, thereby generating a display image (step S217).

When the skid rate is equal to or greater than the threshold value ST2 (step S215: No) or when the steering angle is equal to or greater than the threshold value AT (step S216: No), the display image generation unit thereafter performs processing of adding the display of the third modification to all the past images included in the display image in a state where the degree of emphasis is increased, thereby generating a display image (step S218). The reason why the degree of emphasis is increased when the steering angle is large is that if continuous skid occurs in a state where the steering angle is large, it is estimated that sideslip occurs. Since sideslip may lead to a wheel fall off or falling off the road, it should be noted that more caution should be taken in sideslip than longitudinal skid (such as a spin of drive wheels).

Each unit of the display ECU continues the underfloor transmission display even after the processing in step S217 or step S218 (step S201).

Thereafter, the display ECU of the fifth modification continues the processing of steps S201 to S218, for example, until any of the end conditions described in the above-described embodiment is satisfied. The display ECU of the fifth modification can also perform the processing of ending the underfloor transmission display from any of steps S201 to S218 when any end condition is satisfied. In addition, in the display ECU of the fifth modification as well, the end processing of the underfloor transmission display for each of these end conditions may be performed by the procedure of the above-described embodiment.

The display ECU of the fifth modification achieves the same effects as at least one of the above-described embodiment and first to fourth modifications.

Other Embodiments

In the above-described embodiment and first to fifth modifications, the display image generation processing is performed with the vehicle 1 as reference coordinates. However, the display ECU may perform the display image generation processing on the basis of absolute coordinates. Such a mode is illustrated in FIGS. 19 and 20.

Figure 19:
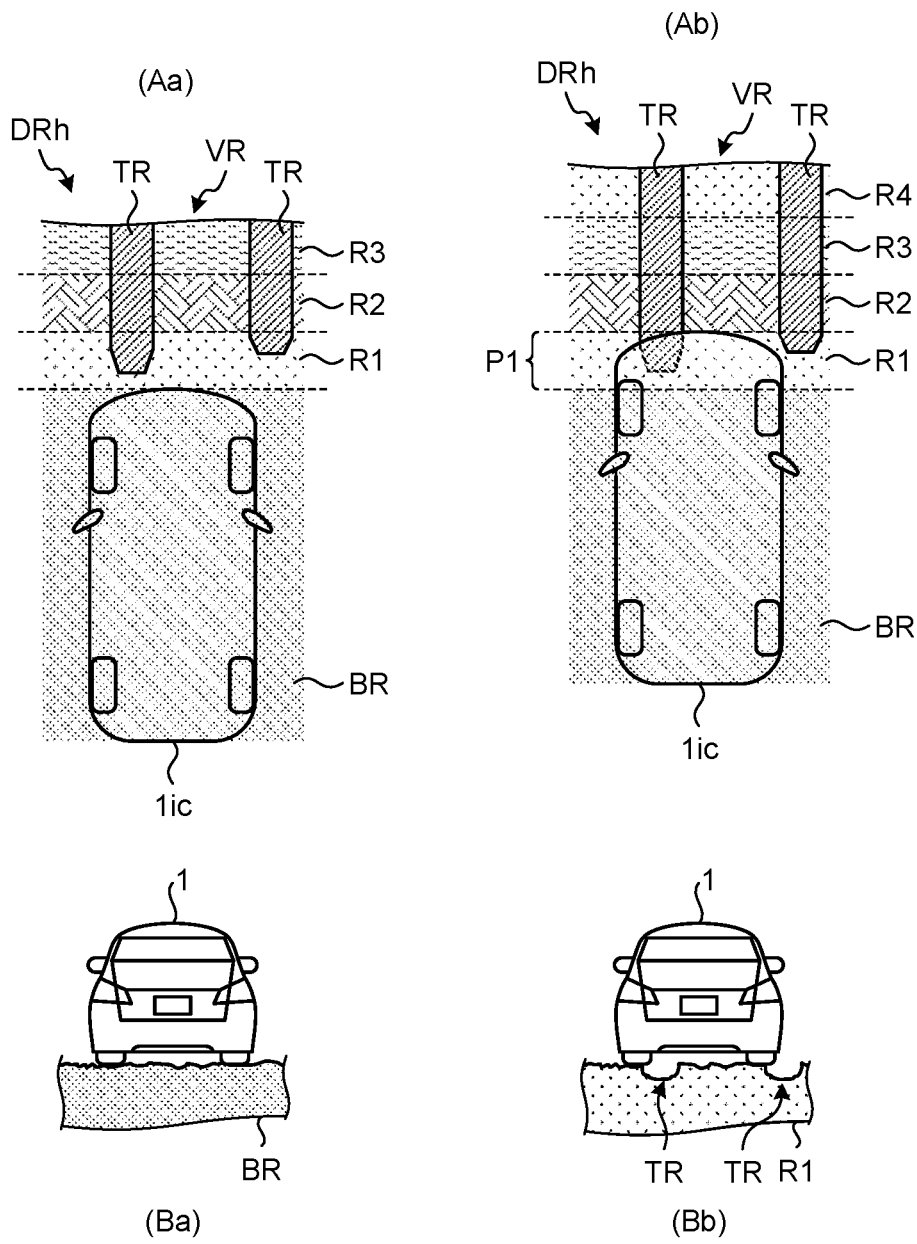
FIG. 19 is a schematic diagram illustrating an underfloor transmission display function included in a display ECU according to another embodiment.
Figure 20:
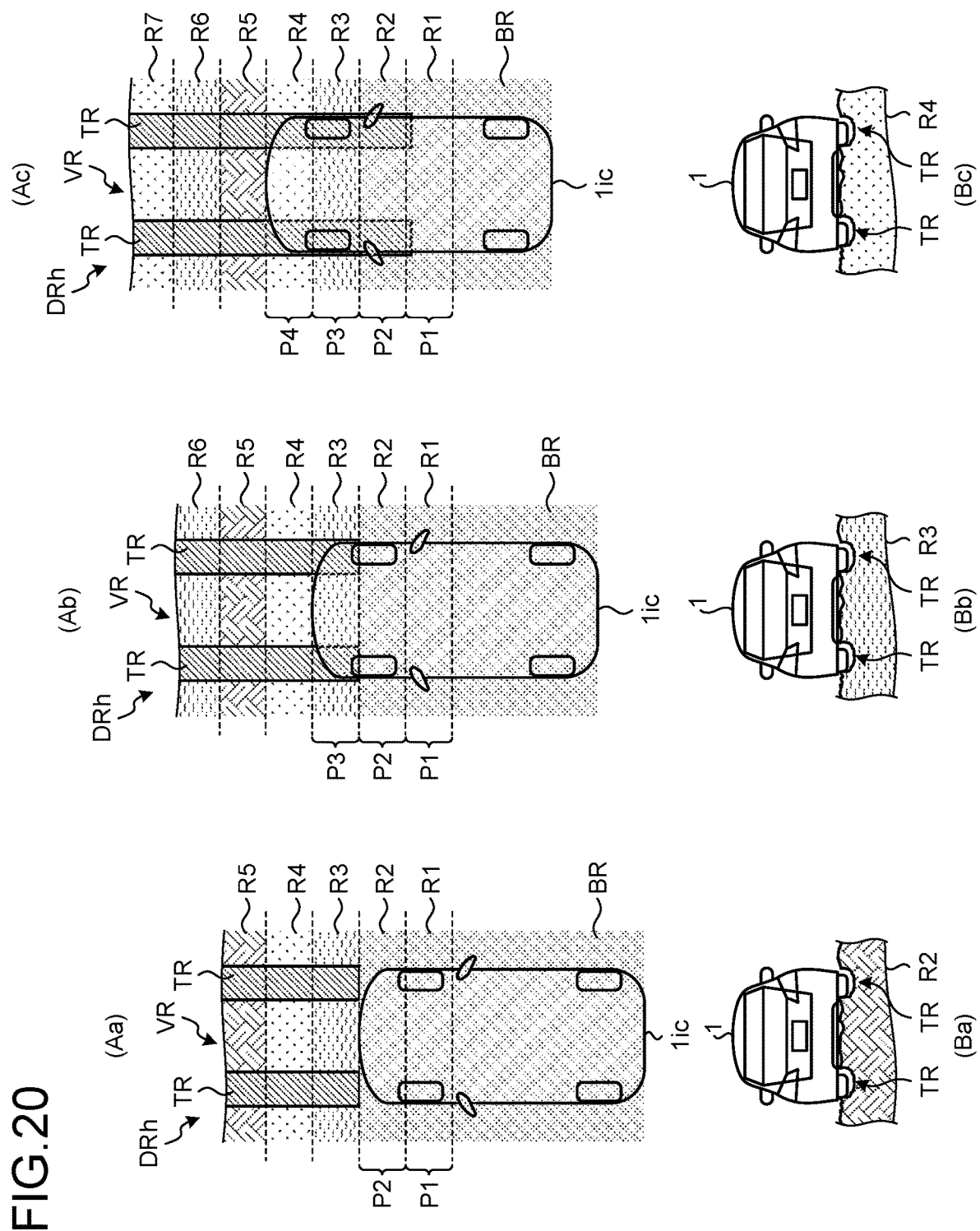
FIG. 20 is a schematic diagram illustrating the underfloor transmission display function included in the display ECU according to another embodiment.

FIGS. 19 and 20 are schematic diagrams illustrating an underfloor transmission display function of a display ECU according to another embodiment.

As illustrated in Part Aa of FIG. 19, when the occupant performs an operation to start the underfloor transmission display on the HMI device, the display image generation unit combines the latest images to generate a display image DRh having a bird's-eye view image VR (real-time image) including regions R1 to R3, a black image region BR in which no image exists, and a vehicle icon 1ic. Part Ba of FIG. 19 illustrates an actual state of the vehicle 1 at this time.

As illustrated in Parts Aa and Bb of FIG. 19, when the vehicle 1 moves in a course passing the side of a rut TR formed on the road surface, the region R1 in the bird's-eye view image VR enters a blind spot region due to forward movement of the vehicle 1. The estimation unit estimates that the vehicle 1 has moved forwards by the vertical width of the region R1, and a past image generation unit registers a portion of the region R1 in the bird's-eye view image VR at the time point of Part Aa of FIG. 19 as a past image P1.

That is, in this embodiment, a portion of the bird's-eye view image VR that has entered a blind spot due to the movement of the vehicle 1 is registered as the past image P1, and the past image P1 is not generated by moving the image or the like. Only the position of the vehicle 1 with respect to the bird's-eye view image VR and the past image PA moves. In the processing of registering the portion of the bird's-eye view image VR as the past image P1, for example, when each pixel in the region R1 has a flag indicating the bird's-eye view image VR (real-time image), the flag of each pixel may be rewritten to a flag indicating the past image P1.

The display image generation unit combines the bird's-eye view image VR obtained by combining the latest image at the time point in Part Ab of FIG. 19 with the past image P1 having the capturing time of the time point in Part Aa of FIG. 19, and generates the display image DRh to which the display of the black image region BR is further added. For example, the display control unit refers to the flag of each pixel to output an image to the HMI device, outputs pixel values of a pixel having a flag of the bird's-eye view image VR and a flag of the past image P1, that is, a pixel between a region of the bird's-eye view image VR and a region (region R1) of the past image P1 as it is, and sets the pixel values (R, G, B) to (0, 0, 0) with the pixel having a flag of an initial value as the black image region BR.

Here, when the display image DRh is generated on the basis of the absolute coordinates, the display image generation unit moves the display range by the movement amount of the vehicle 1 with the road surface as a reference. That is, in the display ECU of this embodiment, internal processing is performed by regarding the bird's-eye view image VR as an image pasted on the road surface, and the bird's-eye view image VR is not moved even if the vehicle 1 moves, and only a range to be cut out as the display image DRh is moved.

When the vehicle 1 further moves forwards from the state of Part Ab of FIG. 20, the region R2 in the bird's-eye view image VR enters a blind spot as illustrated in Part Aa of FIG. 20. At this time, as illustrated in Part Ba of FIG. 20, it is assumed that the vehicle 1 sideslips and falls into the rut TR. The estimation unit estimates that the vehicle 1 has moved forwards by, for example, the vertical width of the region R2, and detects a skid phenomenon due to sideslip of the vehicle 1. The past image generation unit registers the bird's-eye view image VR of the region R2 at the time point of Part Ab of FIG. 19 as a past image P2.

When the skid phenomenon is detected, the display image generation unit prohibits the display of the past images P1 and P2 before the occurrence time of the skid phenomenon, and generates the display image DRh in which the display of the black image region BR including the ranges of the regions R1 and R2 is added to the bird's-eye view image VR obtained by combining the latest image at the time point of Part Ab of FIG. 19. For example, the display control unit performs image output to the HMI device with reference to the flag of each pixel, prohibits the output of the pixels having the flags of the past image P1 and the past image P2, and sets the pixel values to (0, 0, 0) as the black image region BR, similarly to the pixel whose flag is the initial value.

As illustrated in Parts Ab and Bb of FIG. 20, when the vehicle 1 further moves forwards while falling into the rut TR, the region R3 in the bird's-eye view image VR enters a blind spot. The estimation unit estimates that the vehicle 1 has moved forwards by the vertical width of the region R3, and the past image generation unit registers the bird's-eye view image VR of the region R3 at the time point of Part Aa of FIG. 20 as a past image P3.

While the past images P1 and P2 are not displayed, the display image generation unit combines the past image P3 having the capturing time at the time point in Part Aa of FIG. 20 with the bird's-eye view image VR obtained by combining the latest image at the time point in Part Ab of FIG. 20, and generates the display image DRh to which the display of the black image region BR is further added. For example, the display control unit performs image output to the HMI device with reference to the flag of each pixel, permits the output of the pixel having the flag of the bird's-eye view image VR and the past image P3, but prohibits the output of the pixel having the flag of the past image P1 and the past image P2, and sets the pixel values to (0, 0, 0) as the black image region BR, similarly to the pixel having the flag as the initial value.

As illustrated in Parts Ac and Bc of FIG. 20, when the vehicle 1 further moves forwards while falling into the rut TR, the region R4 in the bird's-eye view image VR enters a blind spot. For example, the estimation unit estimates that the vehicle 1 has moved forwards by the vertical width of the region R4, and the past image generation unit registers the image of the region R4 in the bird's-eye view image VR at the time point of Part Ab of FIG. 20 as a past image P4.

The display image generation unit combines the past image P3 having the capturing time at the time point in Part Aa of FIG. 20 and the past image P2 having the capturing time at the time point in Part Ab of FIG. 20 with the bird's-eye view image VR obtained by combining the latest image at the time point in Part Ac of FIG. 20 while hiding the past images P1 and P2, and generates the display image DRh to which the display of the black image BR is further added.

For example, the display control unit performs image output to the HMI device with reference to the flag of each pixel, permits the output of the pixel having the flag of the bird's-eye view image VR, the past image P3, and the past image P4, but prohibits the output of the pixel having the flag of the past image P1 and the past image P2, and sets the pixel values to (0, 0, 0) as the black image region BR, similarly to the pixel having the flag of the initial value.

The flags of the past image P1 and the past image P2 may be the same flag, and the flags of the past image P3 and the past image P4 may be the same flag. Since the display control unit determines the flag and prohibits the display of the past image P1 and the past image P2, and the past image P1 and the past image P2 are not erased, the past image P1 and the past image P2 can be displayed only by changing a determination condition of the display control unit.

By repeating the above processing, even in a case where the processing on the basis of the absolute coordinates is performed, the black image region BR allocated to the blind spot below the vehicle body is gradually replaced with the past images (P1, P2), P3, P4, . . . , and finally, all the black image regions BR are replaced with the past images, and the display image DRh as if the underfloor space of the vehicle body is seen is obtained.

In addition, even when the processing on the basis of the absolute coordinates is performed, only the internal processing of the display ECU is different, and the same output image as those of the above-described embodiment and first to fifth modifications using the vehicle 1 as the reference coordinates can be obtained. In practice, the display images VRh of Parts Aa and Ab of FIG. 19 and Parts Aa, Ab, and Ac of FIG. 20 are the same as the display images VR illustrated in Parts Aa and Ab of FIG. 5, Part Ac of FIG. 6, and Parts Aa and Ab of FIG. 7 in the above-described embodiments.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

With the display processing device, a display processing method, and a recording medium according to the present disclosure, it is possible to suppress erroneous recognition by an occupant even in a case where a shift occurs in an image while suppressing costs.

What is claimed is:

1. A display processing device installed in a vehicle, the display processing device comprising:
   a hardware processor coupled to a memory and configured to:
   acquire an image obtained by capturing a periphery of the vehicle;
   generate a bird's-eye view image of the periphery of the vehicle on the basis of the image;
   estimate a movement amount of the vehicle on the basis of a rotation amount of a wheel detected by the vehicle;
   generate one or more past images whose capturing times are past time points, the one or more past images being generated on the basis of the movement amount of the vehicle and a past bird's-eye view image being the bird's-eye image stored at a past time point; and
   generate a display image to be displayed on a display device in the vehicle, the display image being generated by combining the one or more past images and the bird's-eye view image,
   wherein, when occurrence of a skid phenomenon of the wheel is detected, the hardware processor generates the display image by performing, on the one or more past images, processing indicating that the skid phenomenon has occurred.

2. The display processing device according to claim 1, wherein the hardware processor is configured to
   perform the processing indicating that the skid phenomenon has occurred, only on the one or more past images whose capturing times are before the occurrence of the skid phenomenon, and
   generate, even when the skid phenomenon is detected, the display image in combination with the bird's-eye view image without performing the processing indicating that the skid phenomenon has occurred on one or more past images whose capturing times are after the occurrence of the skid phenomenon.

3. The display processing device according to claim 1, wherein the hardware processor is configured to detect the skid phenomenon on the basis of the rotation amount of the wheel or an acceleration detected by the vehicle.

4. The display processing device according to claim 1, wherein the hardware processor is configured to
   estimate a skid period, a skid speed, or a skid width in the skid phenomenon, and
   generate the display image without performing the processing indicating that the skid phenomenon has occurred, the display image being generated in a case where the skid period, the skid speed, or the skid width is less than a predetermined threshold value.

5. The display processing device according to claim 4, wherein
   the hardware processor is configured to perform, on the one or more past images, the processing indicating that the skid phenomenon has occurred, the processing being performed in a case where the skid period, the skid speed, or the skid width is equal to or greater than the predetermined threshold value, and
   the processing indicating that the skid phenomenon has occurred is processing of hiding the one or more past images or processing of adding an indication indicating that the skid phenomenon has occurred.

6. The display processing device according to claim 5, wherein the hardware processor is configured to
   perform the processing of adding the indication indicating that the skid phenomenon has occurred to the one or more past images as the processing indicating that the skid phenomenon has occurred, the processing being performed in a case where the skid period, the skid speed, or the skid width is equal to or greater than a first threshold value and less than a second threshold value, the second threshold value being greater than the first threshold value, and
   perform the processing of hiding the one or more past images as the processing indicating that the skid phenomenon has occurred, the processing being performed in a case where the skid period, the skid speed, or the skid width is equal to or greater than the second threshold value.

7. The display processing device according to claim 1, wherein the hardware processor is configured to perform processing of adding an indication indicating the number of times of occurrence of the skid phenomenon to the one or more past images as the processing indicating that the skid phenomenon has occurred.

8. The display processing device according to claim 1, wherein the hardware processor is configured to
   estimate a skid direction in the skid phenomenon, and
   perform processing of adding an indication indicating the skid direction to the one or more past images as the processing indicating that the skid phenomenon has occurred.

9. The display processing device according to claim 1, wherein the hardware processor is configured to performs the processing indicating that the skid phenomenon has occurred on all the past images to be displayed in combination with the bird's-eye view image, the processing being performed in a case where the skid phenomenon is detected continuously or intermittently.

10. The display processing device according to claim 1, wherein the hardware processor is configured to cancel or change at least part of the processing performed on the one or more past images, the cancelation or change being performed in a case where a speed of the vehicle is less than a predetermined value or in a case where an operation is performed by an occupant of the vehicle.

11. The display processing device according to claim 10, wherein the hardware processor is configured not to cancel the cancelation or change of the processing even if the speed of the vehicle exceeds the predetermined value after the operation by the occupant of the vehicle is performed when the speed of the vehicle is less than the predetermined value.

12. The display processing device according to claim 1, wherein the hardware processor is configured to
    detect a touch operation on the display device, and
    perform processing of moving display positions of the one or more past images in the display image in response to the touch operation by an occupant of the vehicle.

13. The display processing device according to claim 10, wherein the hardware processor is configured not to accept the operation by the occupant of the vehicle and the touch operation by the occupant of the vehicle in a case where the operation by the occupant of the vehicle or the touch operation by the occupant of the vehicle is performed and the speed of the vehicle is equal to or greater than the predetermined value.

14. A display processing method comprising:
    acquiring an image obtained by capturing a periphery of the vehicle;
    generating a bird's-eye view image of the periphery of the vehicle on the basis of the image;
    estimating a movement amount of the vehicle on the basis of a rotation amount of a wheel detected by the vehicle;
    generating one or more past images whose capturing times are past time points, the one or more past images being generated on the basis of the movement amount of the vehicle and a past bird's-eye view image being the bird's-eye image stored at a past time point; and
    generating a display image to be displayed on a display device in the vehicle, the display image being generated by combining the one or more past images and the bird's-eye view image,
    wherein, when occurrence of a skid phenomenon of the wheel is detected, the generating of the display image is performed by performing, on the one or more past images, processing indicating that the skid phenomenon has occurred.

15. A non-transitory computer-readable recording medium on which programmed instructions are recorded, the instructions causing a computer to:
    acquire an image obtained by capturing a periphery of the vehicle;
    generate a bird's-eye view image of the periphery of the vehicle on the basis of the image;
    estimate a movement amount of the vehicle on the basis of a rotation amount of a wheel detected by the vehicle;
    generate one or more past images whose capturing times are past time points, the one or more past images being generated on the basis of the movement amount of the vehicle and a past bird's-eye view image being the bird's-eye image stored at a past time point;
    generate a display image to be displayed on a display device in the vehicle, the display image being generated by combining the one or more past images and the bird's-eye view image; and,
    when occurrence of a skid phenomenon of the wheel is detected, generate the display image by performing, on the one or more past images, processing indicating that the skid phenomenon has occurred.

* * * * *